(12) United States Patent
Son

(10) Patent No.: US 11,130,243 B2
(45) Date of Patent: Sep. 28, 2021

(54) TOOL COUPLER, TOOL CHANGER, TOOL MOUNTER, AND TOOL CHANGE SYSTEM HAVING THE SAME

(71) Applicant: LG ELECTRONICS INC., Seoul (KR)

(72) Inventor: Changwoo Son, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/839,186

(22) Filed: Apr. 3, 2020

(65) Prior Publication Data

US 2021/0078186 A1   Mar. 18, 2021

(30) Foreign Application Priority Data

Sep. 17, 2019   (KR) ........................ 10-2019-0114072

(51) Int. Cl.
| | |
|---|---|
| *B25J 15/04* | (2006.01) |
| *B25J 15/06* | (2006.01) |
| *B25J 11/00* | (2006.01) |
| *B25B 11/00* | (2006.01) |
| *B23Q 3/155* | (2006.01) |

(52) U.S. Cl.
CPC ....... *B25J 15/0441* (2013.01); *B25J 15/0608* (2013.01); *B23Q 3/1554* (2013.01); *B25B 11/002* (2013.01); *B25J 11/008* (2013.01); *B25J 11/0045* (2013.01)

(58) Field of Classification Search
CPC .. B25J 15/0441; B25J 15/0608; B25J 11/008; B25J 11/0045; B23Q 3/1554; B25B 11/002
USPC .................................................. 335/296, 302
See application file for complete search history.

(56) References Cited

U.S. PATENT DOCUMENTS

| | | | |
|---|---|---|---|
| 10,414,055 B2 | 9/2019 | Kerestes et al. | |
| 2018/0304475 A1* | 10/2018 | Zachary | ............... B25J 15/0416 |

* cited by examiner

*Primary Examiner* — Jermie E Cozart
(74) *Attorney, Agent, or Firm* — Birch, Stewart, Kolasch & Birch, LLP

(57) ABSTRACT

A tool system including a housing fastened to a tool, the housing being formed of a non-magnetic material, a magnet module embedded in the housing, a pair of mounting grooves in the housing and located below the magnet module, a changer body provided on a manipulator, the changer body being formed a non-magnetic material, a metal bar mounted on the changer body, a pair of terminals provided at both ends of the metal bar, the pair of terminals being formed of magnetic material, the pair of terminals facing the magnet module, a fixing bar outside the housing, the fixing bar being formed of a magnetic material, and a pair of mounting pins extending vertically from both ends of the fixing bar, the pair of mounting pins being formed of magnetic materials, and the pair of mounting pins are inserted into the pair of mounting grooves is provided.

20 Claims, 23 Drawing Sheets

TOOL COUPLER, TOOL CHANGER, TOOL MOUNTER, AND TOOL CHANGE SYSTEM HAVING THE SAME

CROSS-REFERENCE TO RELATED APPLICATIONS

The present application claims priority under 35 U.S.C. 119 to Korean Patent Application No. 10-2019-0114072, filed on 17 Sep. 2019, which is hereby incorporated by reference in its entirety

BACKGROUND

The present disclosure relates to a tool coupler fastened to a tool, a tool changer for exchanging the tool, a tool mounter for mounting the tool thereon, and a tool change system including the tool coupler, the tool changer, and the tool mounter.

In general, a machine that uses electric or magnetic action to perform a motion similar to a human's motion is called a robot. Recently, the robot has been used in various fields due to a development of control technology. Examples of the robot include surgical robots, housekeeping robots, service robots, aerospace remote robots, dangerous articles handling robots, and the like. These robots perform a task using a manipulator designed to move close to a movement of an arm or hand by electrical and mechanical mechanisms.

In particular, the housekeeping robot may perform a specific task by fastening a specific tool to the manipulator. For example, a cooking robot may perform cooking by fastening various tools such as ladles, tongs, pots, and the like to the manipulator.

Therefore, it is important for a tool changer provided on the manipulator to change the tool quickly and accurately in order to improve a task efficiency of the robot.

However, since the conventional tool changer uses a pneumatic system, a large structure and additional equipment are required, resulting in high cost and noise.

SUMMARY

A purpose of the present disclosure is to provide a tool change system that is compact and is able to change a tool fast and reliably, and a tool coupler, tool changer, and a tool mounter included in such tool change system.

In a first aspect of the present disclosure, there is provided a tool change system including a housing fastened to a tool, wherein the housing is a non-magnetic material, a magnet module embedded in the housing, a pair of mounting grooves defined in the housing and located below the magnet module, a changer body provided on a manipulator, wherein the changer body is a non-magnetic material, a metal bar mounted on the changer body, a pair of terminals provided at both ends of the metal bar, wherein the pair of terminals are magnetic materials, wherein the pair of terminals face the magnet module, a fixing bar fixed to a structure located outside the housing, wherein the fixing bar is a magnetic material, and a pair of mounting pins extending vertically upward from both ends of the fixing bar, wherein the pair of mounting pins are magnetic materials, wherein the pair of mounting pins are respectively inserted into the pair of mounting grooves.

In one implementation of the first aspect, the metal bar and the pair of terminals may be configured to form a first magnetic flux loop with the magnet module, and the fixing bar and the pair of mounting pins may be configured to form a second magnetic flux loop with the magnet module.

In one implementation of the first aspect, the housing may include a housing body having an internal space configured to accommodate the magnet module therein, and a housing cover covering the internal space and facing the changer body. Outer recesses may be defined in an outer surface of the housing cover, wherein the pair of terminals are respectively inserted into the outer recesses.

In one implementation of the first aspect, inner recesses corresponding to the outer recesses may be defined in an inner surface of the housing cover, and a portion of the magnet module may be inserted into the inner recesses.

In one implementation of the first aspect, a support pin protruding toward the housing cover may be formed on the changer body, and an insertion hole may be configured to insert the support pin therein is defined in the housing cover.

In one implementation of the first aspect, the magnet module may include a magnet and a pair of metal bodies respectively connected to both poles of the magnet, wherein the pair of metal bodies may face the terminal, and wherein the pair of metal bodies may be located above the pair of mounting pins.

In one implementation of the first aspect, the magnet module may include a metal body elongated in one direction and a pair of magnets facing the terminal, wherein the pair of magnets of opposite poles may be respectively attached to both ends of the metal body.

In one implementation of the first aspect, the magnet may be magnetized in an oblique direction with respect to the terminal and the mounting pin.

In a second aspect of the present disclosure, there is provided a tool coupler fastened to a tool, wherein the tool coupler is selectively fastened to a tool changer and mounted to or detached from a tool mounter. The tool coupler includes a non-magnetic housing, a magnet module embedded in the housing, fastening portions formed on the housing and fastened to the tool, a pair of insertion holes defined in the housing, wherein support pins of the tool changer are respectively inserted therein, and a pair of mounting grooves defined in the housing and located below the magnet module, wherein mounting pins of the tool mounter are respectively inserted into the pair of mounting grooves.

In one implementation of the second aspect, the magnet module may be configured to form a first magnetic flux loop with a metal bar and a pair of terminals of the tool changer, wherein the pair of terminals may be formed at both ends of the metal bar. Further, the magnet module may be configured to form a second magnetic flux loop with a fixing bar and a pair of mounting pins of the tool mounter, wherein the mounting pins may be formed at both ends of the fixing bar and respectively inserted into the mounting grooves.

In one implementation of the second aspect, the housing may include a housing body having the fastening portions formed thereon and the mounting grooves defined therein, wherein the housing body has an internal space configured to accommodate the magnet module therein and a housing cover covering the internal space and having the insertion holes defined therein, wherein outer recesses may be defined in an outer surface of the housing cover, and wherein the pair of terminals may be respectively inserted into the outer recesses.

In one implementation of the second aspect, the inner recesses corresponding to the outer recesses may be defined in an inner surface of the housing cover, wherein a portion of the magnet module may be inserted into the inner recesses.

In one implementation of the second aspect, a thickness of a portion between the outer recess and the inner recess may be less than a thickness of the housing body and a thickness of the housing cover.

In one implementation of the second aspect, the magnet module may include a magnet and a pair of metal bodies respectively connected to both poles of the magnet, wherein the pair of metal bodies may face the tool changer.

In one implementation of the second aspect, the tool coupler may further include a buffer member disposed on the housing, and the buffer member is configured to contact with the tool mounter.

In a third aspect of the present disclosure, there is provided a tool changer selectively fastened to a tool coupler fastened to a tool, wherein the tool changer mounts the tool coupler to a tool mounter or separates the tool coupler from the tool mounter. The tool changer includes a non-magnetic changer body, a metal bar mounted on the changer body, wherein the metal bar is a non-magnetic material, a pair of terminals formed at both ends of the metal bar, wherein the pair of terminals are magnetic materials, wherein the pair of terminals penetrate the changer body toward the tool coupler.

In one implementation of the third aspect, the metal bar and the pair of terminals may be configured to form a magnetic flux loop together with a magnet module of the tool coupler to distribute a magnetic force between the tool coupler and the tool mounter.

In one implementation of the third aspect, the tool changer may further include a buffer member disposed on the changer body, and the buffer member is configured to contact with the tool coupler.

In a fourth aspect of the present disclosure, there is provided a tool mounter for fastening a tool coupler thereon, wherein the tool coupler is fastened to a tool and is selectively attached to a tool changer. The tool mounter includes a magnetic fixing bar and a pair of mounting pins extending vertically upward from both ends of the fixing bar, wherein the pair of mounting pins are magnetic materials, wherein the pair of mounting pins are respectively inserted into a pair of mounting grooves of the tool coupler.

In one implementation of the fourth aspect, the fixing bar and the pair of mounting pins may be configured to form a magnetic flux loop together with a magnet module of the tool coupler to distribute a magnetic force between the tool coupler and the tool changer.

DESCRIPTION OF SPECIFIC EMBODIMENTS

Figure 1:
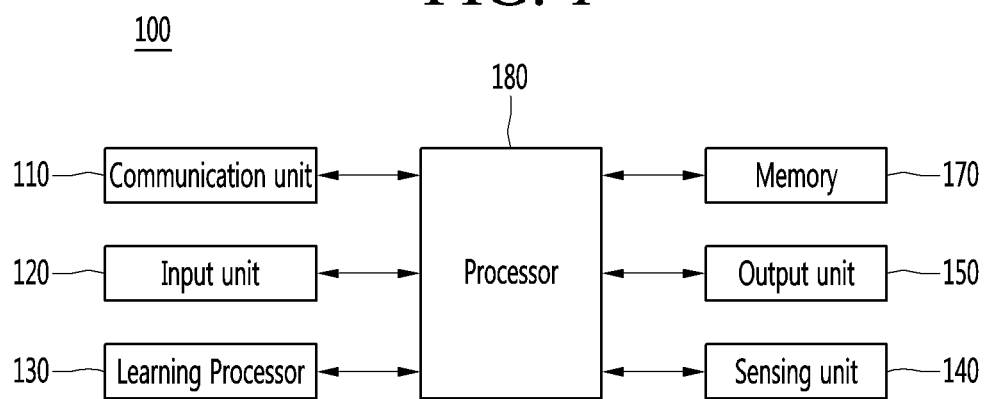
FIG. 1 illustrates an AI device including a robot according to an embodiment of the present disclosure.

Hereinafter, specific embodiments of the present disclosure will be described in detail with drawings.

With respect to constituent elements used in the following description, suffixes "module" and "unit" are given only in consideration of ease in the preparation of the specification, and do not have or serve as different meanings. Accordingly, the suffixes "module" and "unit" may be used interchangeably.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues.

Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

FIG. 1 illustrates an AI device 100 including a robot according to an embodiment of the present disclosure.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
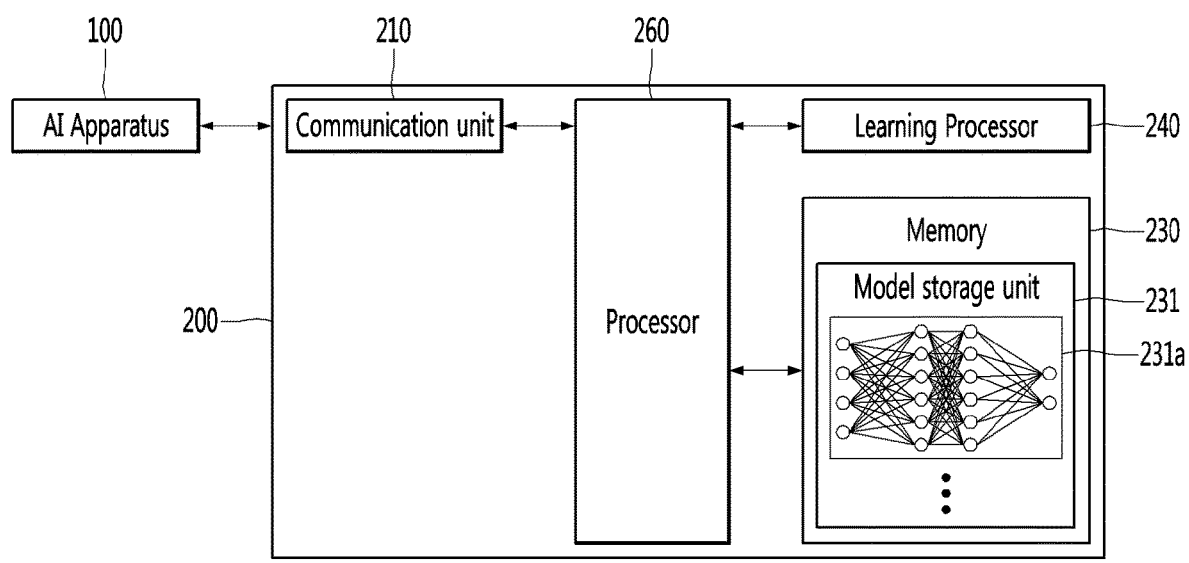
FIG. 2 illustrates an AI server connected to a robot according to an embodiment of the present disclosure.

FIG. 2 illustrates an AI server 200 connected to a robot according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231*a*) through the learning processor 240.

The learning processor 240 may learn the artificial neural network 231*a* by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
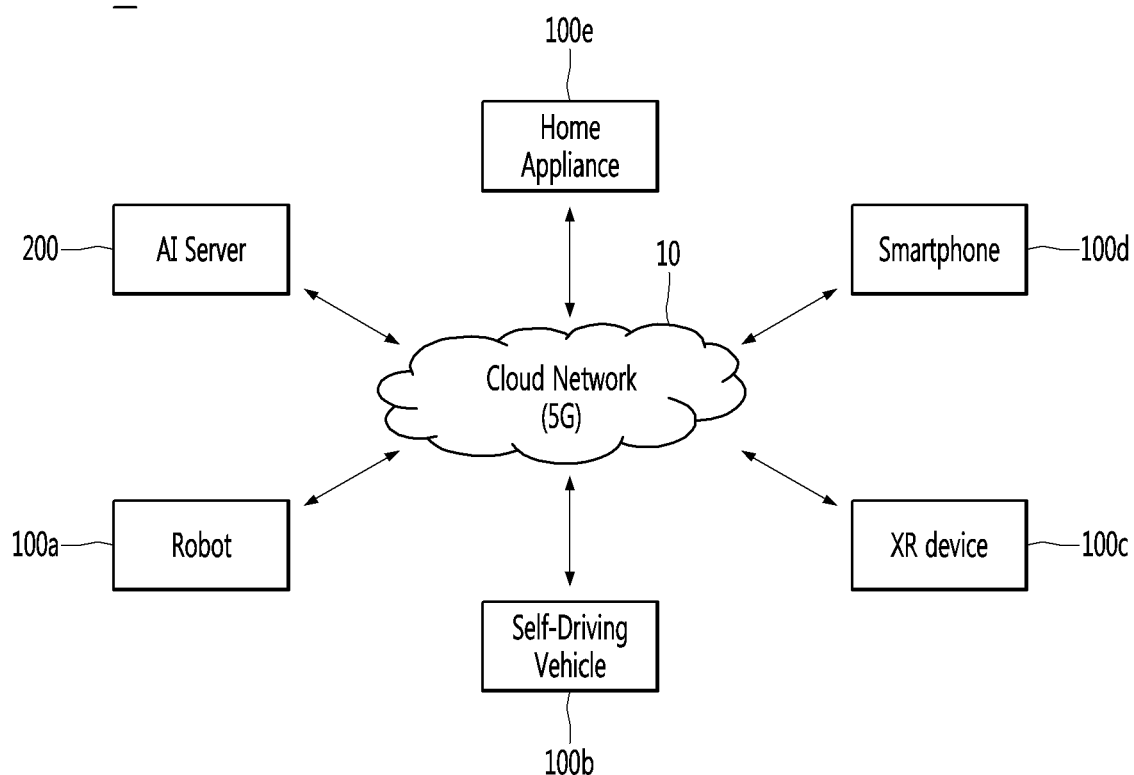
FIG. 3 illustrates an AI system according to an embodiment of the present disclosure.

FIG. 3 illustrates an AI system 1 according to an embodiment of the present disclosure.

Referring to FIG. 3, in the AI system 1, at least one of an AI server 200, a robot 100*a*, a self-driving vehicle 100*b*, an XR device 100*c*, a smartphone 100*d*, or a home appliance 100*e* is connected to a cloud network 10. The robot 100*a*, the self-driving vehicle 100*b*, the XR device 100*c*, the smartphone 100*d*, or the home appliance 100*e*, to which the AI technology is applied, may be referred to as AI devices 100*a* to 100*e*.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100*a* to 100*e* and 200 configuring the AI system 1 may be connected to each other through the cloud network 10. In particular, each of the devices 100*a* to 100*e* and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100*a*, the self-driving vehicle 100*b*, the XR device 100*c*, the smartphone 100*d*, or the home appliance 100*e* through the cloud network 10, and may assist at least part of AI processing of the connected AI devices 100*a* to 100*e*.

At this time, the AI server 200 may learn the artificial neural network according to the machine learning algorithm instead of the AI devices 100*a* to 100*e*, and may directly store the learning model or transmit the learning model to the AI devices 100*a* to 100*e*.

At this time, the AI server 200 may receive input data from the AI devices 100*a* to 100*e*, may infer the result value for the received input data by using the learning model, may generate a response or a control command based on the inferred result value, and may transmit the response or the control command to the AI devices 100*a* to 100*e*.

Alternatively, the AI devices 100*a* to 100*e* may infer the result value for the input data by directly using the learning model, and may generate the response or the control command based on the inference result.

Hereinafter, various embodiments of the AI devices 100*a* to 100*e* to which the above-described technology is applied will be described. The AI devices 100*a* to 100*e* illustrated in FIG. 3 may be regarded as a specific embodiment of the AI device 100 illustrated in FIG. 1.

<AI+Robot>

The robot 100*a*, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

Figure 4:
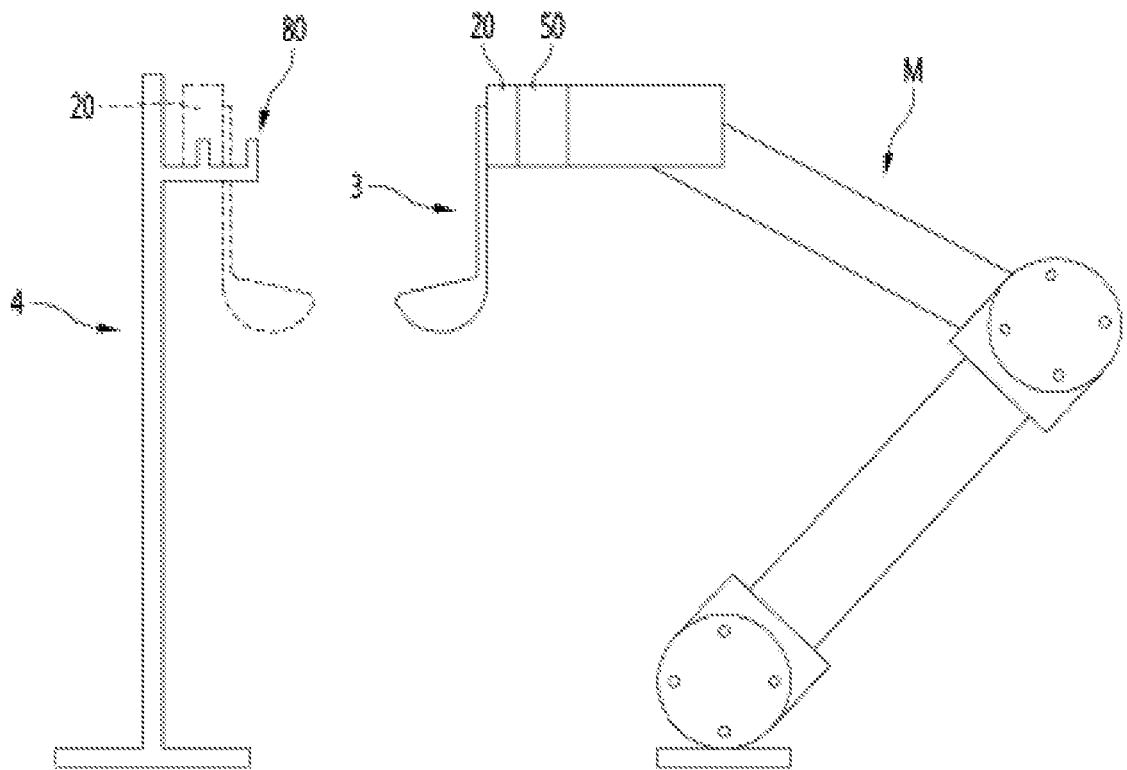
FIG. 4 is a schematic diagram of a tool change system according to an embodiment of the present disclosure.
Figure 5:
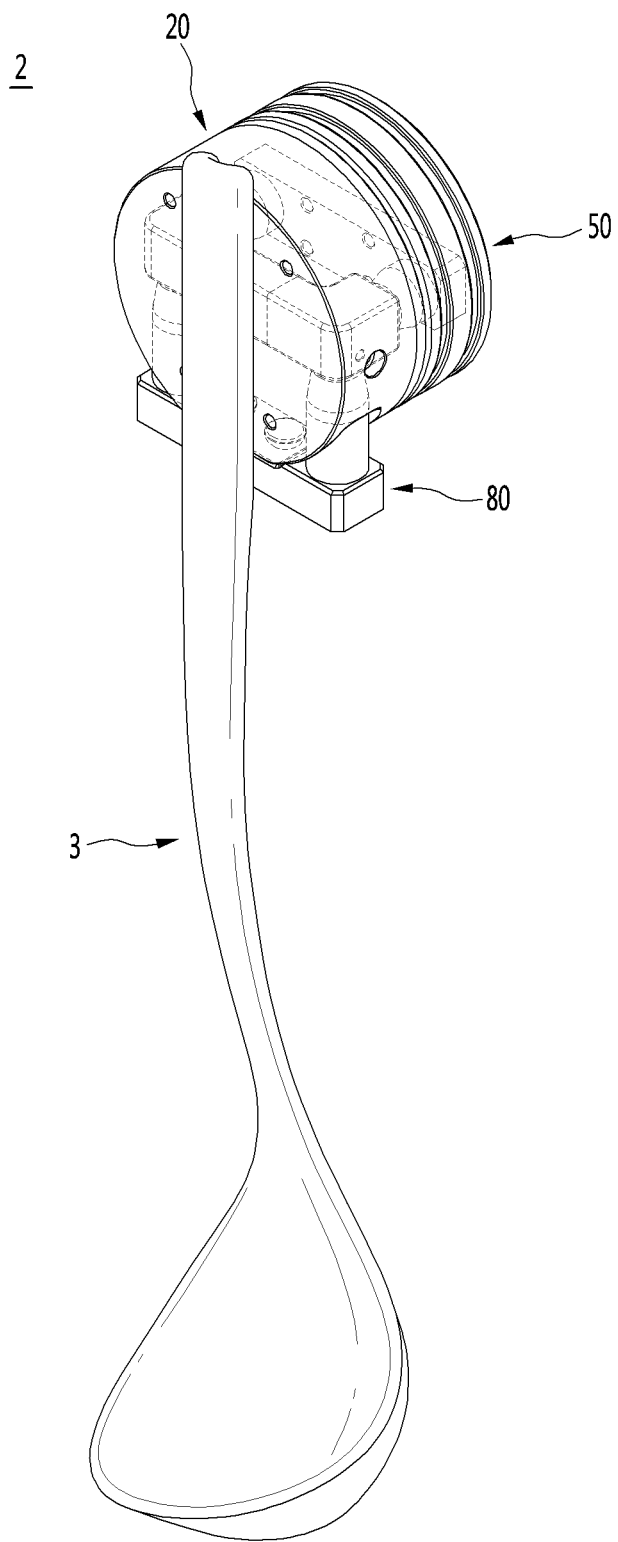
FIG. 5 is a perspective view illustrating a state in which a tool is mounted on a tool change system according to an embodiment of the present disclosure.

FIG. 4 is a schematic diagram of a tool change system according to an embodiment of the present disclosure, and FIG. 5 is a perspective view illustrating a state in which a tool is mounted on a tool change system according to an embodiment of the present disclosure.

A tool change system 2 according to an embodiment of the present disclosure includes a tool coupler 20, a tool changer 50, and a tool mounter 80. The tool change system 2 may further include a manipulator M.

Hereinafter, for convenience, the tool coupler 20 is referred to as a 'coupler', the tool changer 50 as a 'changer', and the tool mounter 80 as a 'mounter'.

The coupler 20 is fastened to a tool 3. The coupler 20 may be provided separately from the tool 3. Thus, the coupler 20 may be used in a compatible manner with various types of the tool 3. The tool 3 may be a tool required to perform a task of the manipulator M. The tool 3 may be a tool required for the task of the manipulator M. For example, the tool 3 may be one of a cutlery, a ladle, and a spatula.

The coupler 20 is selectively fastened with the changer 50. In addition, the coupler 20 may be mounted to or separated from the mounter 80. The coupler 20 may be mounted to or detached from a top of the mounter 80.

The changer 50 may be provided on the manipulator M. In more detail, the changer 50 may be provided at an end of the manipulator M. The manipulator M may be a component included in the above-described robot 100a.

The changer 50 may be selectively fastened with the coupler 20. The changer 50 may separate the tool 3 and the coupler 20 from the mounter 80, or may mount the tool 3 and the coupler 20 to the mounter 80.

The mounter 80 is configured to mount the coupler 20. The coupler 20 fastened to the tool 3 may be mounted on the mounter 80, so that the tool 3 may be mounted on the mounter 80. In addition, the mounter 80 may be fixed to a structure 4. For example, the structure 4 may include a wall, a cradle, a shelf, or the like.

The mounter 80 may include a plurality of mounters. The tool 3 of the same or different type may be mounted on each mounter 80.

The manipulator M may fasten the coupler 20 fastened to the tool 3 suitable for task with the changer 50, and separate the tool 3 and the coupler 20 from the mounter 80. Thereafter, the manipulator M may perform the task using the tool 3 while the tool 3 and the coupler 20 are fastened to the changer 50. When the task is completed, the manipulator M may mount the tool 3 and the coupler 20 on the mounter 80.

Figure 6:
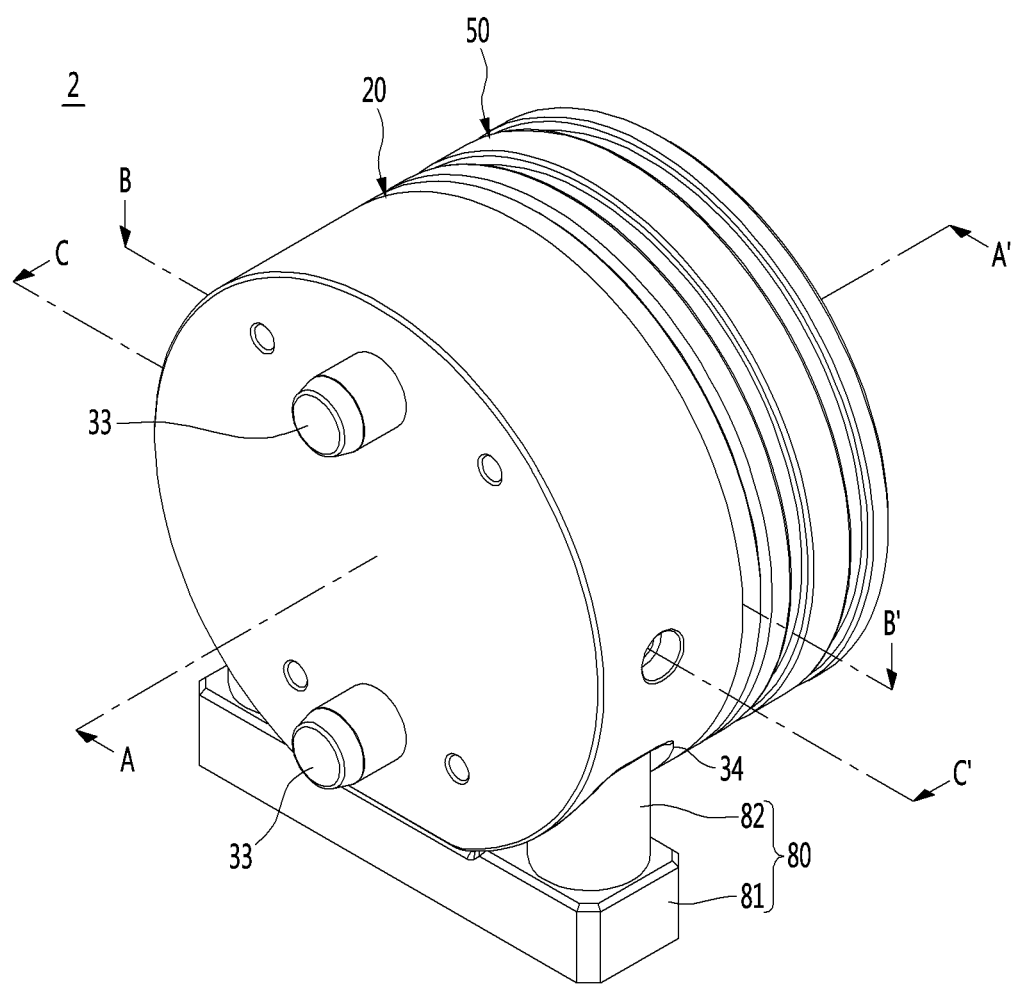
FIG. 6 is a perspective view of a tool change system according to an embodiment of the present disclosure.
Figure 7:
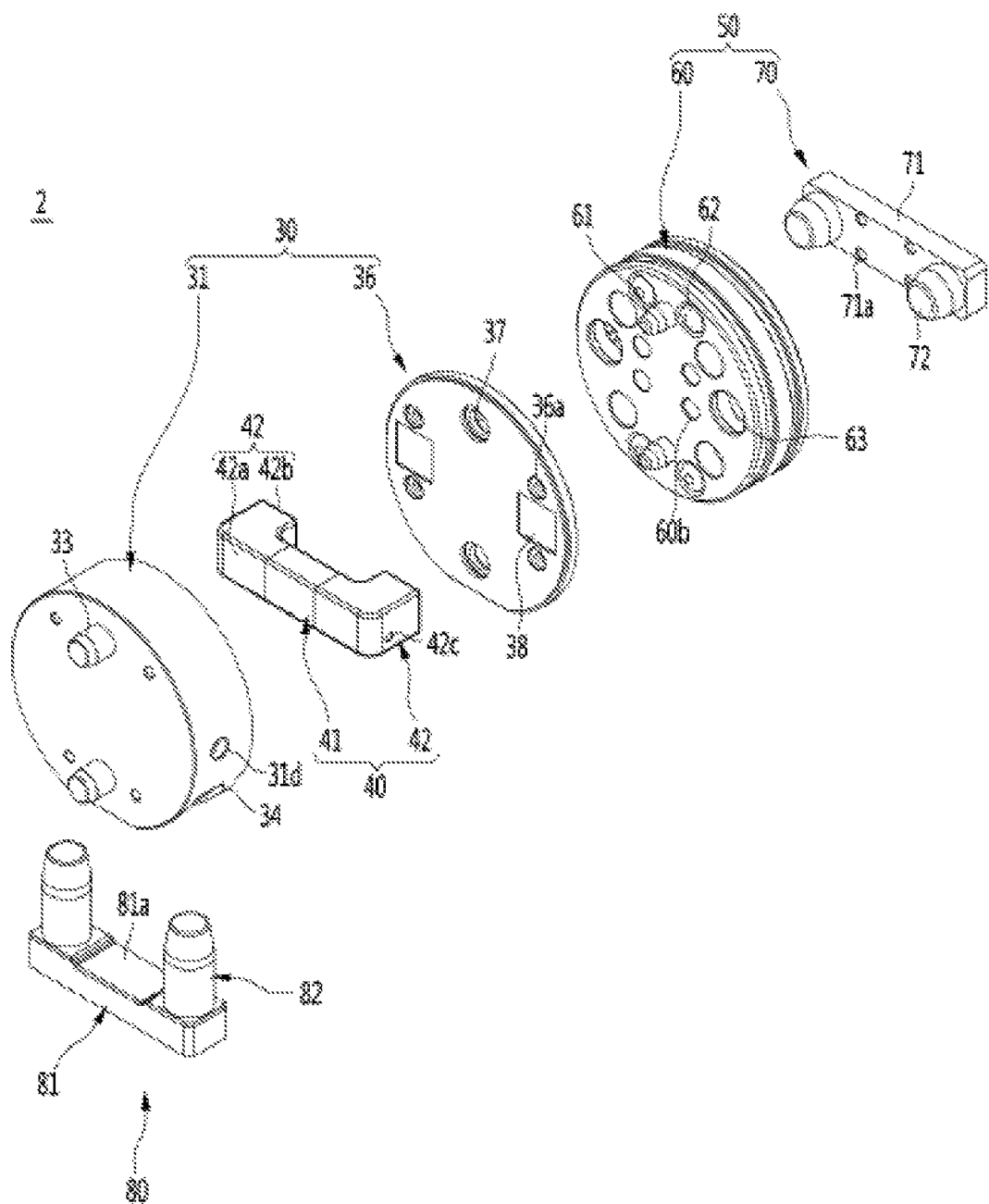
FIG. 7 is an exploded perspective view of a tool change system shown in FIG. 6.

FIG. 6 is a perspective view of a tool change system according to an embodiment of the present disclosure, and FIG. 7 is an exploded perspective view of a tool change system shown in FIG. 6.

As described above, the tool change system 2 may include the coupler 20, the changer 50, and the mounter 80.

The coupler 20 may include a housing 30 and a magnet module 40 embedded in the housing 30. The housing 30 may be referred to as a housing.

The housing 30 may be a non-magnetic material. Thus, the housing 30 may not affect a magnetic field generated by the magnet module 40.

The housing 30 may form an outer shape of the coupler 20. The housing 30 may have a cylindrical shape, but is not limited thereto. The housing 30 may include one surface, the other surface spaced apart from said one surface, and a circumferential surface connecting said one surface and the other surface with each other. Hereinafter, a case in which one surface of the housing 30 is a front surface and the other surface is a rear surface will be described as an example.

In more detail, the housing 30 may include a housing body 31 in which an internal space for receiving the magnet module 40 therein is defined, and a housing cover 36 covering the internal space.

The housing body 31 may include the front surface and the circumferential surface of the housing 30, and the housing cover 32 may include the rear surface of the housing 30. That is, a front surface and a circumferential surface of the housing body 31 may mean the front surface and the circumferential surface of the housing 30, and a rear surface of the housing cover 32 may mean the rear surface of the housing 30.

The housing 30 may include a fastening portion 33 formed thereon to be fastened with the tool 3 (see FIG. 5). In more detail, the front surface of the housing 30 may face the tool 3 and the fastening portion 33 may be formed on the front surface of the housing 30. That is, the fastening portion 33 may be provided on the housing body 31.

The fastening portion 33 may protrude forward. It is preferable that the fastening portion 33 includes a plurality of fastening portions for firmly fastening the tool 3 and the coupler 20 with each other. As an example, the fastening portions 33 may include a pair of fastening portions vertically spaced apart from each other.

The housing 30 may have a mounting groove 34 defined therein, into which a mounting pin 82 of the mounter 80 to be described is inserted. The mounting groove 34 may include a pair of mounting grooves laterally spaced apart from each other.

The mounting groove 34 may be defined in the circumferential surface of the housing 30. The mounting groove 34 may be recessed upward from the circumferential surface of the housing 30 and open downward. That is, the mounting groove 34 may be defined in the housing body 31.

The mounting groove 34 may be located below the magnet module 40, more specifically, below a metal body 42 to be described later.

An insertion hole 37 into which a support pin 61 to be described later of the changer 50 is inserted may be defined in the housing 30. The insertion hole 37 may be defined in the rear surface of the housing 30. That is, the insertion hole 37 may be defined in the housing cover 36. The insertion hole 37 may be defined by penetrating the housing cover 36 in a front and rear direction.

The insertion hole 37 may be tapered in a direction in which an inner diameter thereof decreases inwardly. Therefore, the support pin 61 may be inserted into the insertion hole 37 easily.

The magnet module 40 may be embedded in the housing 30. In more detail, the magnet module 40 may be disposed in the internal space of the housing body 31 and may be covered by the housing cover 36.

The magnet module 40 may include a magnet 41 and a pair of metal bodies 42 connected to both poles of the magnet 41.

The magnet 41 may be elongated in one direction (e.g., a lateral direction). A magnetization direction D (see FIGS. 12 and 13) of the magnet 41 may be parallel to a longitudinal direction of the magnet 41. That is, the both poles (N pole and S pole) of the magnet 41 may be located at both ends of the magnet 41.

The magnet 41 may be disposed between the pair of metal bodies 42. Therefore, a magnetic flux of the magnet 41 may lose a directivity thereof while passing through the metal bodies 42, and a magnetic force may be equally divided to a terminal 72 of a magnetic module 70 and a mounting pin 82 of the mounter 80, which will be described later.

The metal body 42 may be a magnetic material. Therefore, the magnetic field generated by the magnet 41 may be strongly induced along the metal bodies 42.

The pair of metal bodies 42 may be symmetrically arranged about the magnet 41. One of the pair of metal bodies 42 may be attached to a north pole of the magnet 41 and the other may be attached to a south pole of the magnet 41.

Each metal body 42 may be in a 'L' shape. In more detail, the metal body 42 may include an extending portion 42a extending in a longitudinal direction of the magnet 41 and bent portions 42b bent from the extending portion 42a.

The extending portion 42a may be attached to the magnet 41. The bent portion 42b may be bent toward the housing cover 36 at an end of the extending portion 42a.

The housing cover 36 may have an inner recess 38 defined therein facing an end of the metal body 42, more particularly, of the bent portion 42b.

A portion of the magnet module 40 may be inserted into the inner recess 38. In more detail, each end of the bent portion 42b may be located in the inner recess 38.

The inner recess 38 may be defined by recessing a front surface (inner surface) of the housing cover 36, and may be defined at a position corresponding to the end of the bent portion 42b. The inner recess 38 may be stepped with respect to the front surface (inner surface) of the housing cover 36.

In one example, the changer 50 may be located rearward of the coupler 20. The changer 50 may be coupled to or separated from the coupler 20 from the rear of the coupler 20.

The changer 50 may include a changer body 60 and a magnetic module 70 coupled to the changer body 60.

The changer body 60 may face the housing 30, more particularly, the housing cover 36 of the coupler 20.

The changer body 60 may be a non-magnetic material. Thus, the changer body 60 may not affect a magnetic field interacting between the magnet module 40 of the coupler 20 and the magnetic module 70 of the changer 50.

The changer body 60 may form an outer shape of the changer 50. The changer body 60 may be cylindrical, but is not limited thereto. The changer body 60 may include one surface (e.g., a front surface), the other surface (e.g., a rear surface) spaced from the one surface, and a circumferential surface connecting said one surface and the other surface with each other.

The changer 50 may have a support pin 61 for supporting the coupler 20. In more detail, the front surface of the changer body 60 may face the coupler 20, and the support pin 61 may be provided on the front surface of the changer body 60. The support pin 61 is preferably a non-magnetic material.

The support pin 61 may protrude long toward the housing cover 36 of the coupler 20.

The support pin 61 may be inserted into the insertion hole 37 of the coupler 20. Therefore, the support pin 61 may support the coupler 20 in a vertical direction, and may prevent the coupler 20 from falling by gravity.

The support pin 61 may protrude forward. In order to stably support the coupler 20, the support pin 61 preferably includes a plurality of support pins. As an example, the support pin 61 may include a pair of support pins spaced apart from each other vertically.

In addition, the changer 50 may have at least one buffer member 62. The buffer member 62 may contain a material that is elastically deformed, such as rubber, urethane, or the like. The buffer member 62 may be referred to as a changer buffer member.

More specifically, the buffer member 62 may be formed on the front surface of the changer body 60. The buffer member 62 may protrude forward from the front surface of the changer body 60. The buffer member 62 may minimize an impact of the changer 50 on the coupler 20 while the changer 50 approaches the coupler 20.

In addition, the changer body 60 may have a through-hole 63 defined therein, through which a terminal 72 of the magnetic module 70 to be described later passes. The through-hole 63 may include a pair of through-holes spaced apart from each other laterally.

More specifically, the through-hole 63 may be defined in the front surface of the changer body 60, and the terminal 72 may protrude forward of the front surface of the changer body 60 through the through-hole 63.

The magnetic module 70 may be fastened with the changer body 60 from the rear of the changer body 60.

The magnetic module 70 may be a magnetic material. Therefore, the magnetic field generated by the magnet 41 of the magnet module 40 may be strongly induced along the magnetic module 70 while the changer 50 is fastened with the coupler 20.

The magnetic module 70 may include a metal bar 71 and a pair of terminals 72 provided at both ends of the metal bar 71.

The metal bar 71 may be elongated in one direction (e.g., a lateral direction). The metal bar 71 may be elongated in a direction parallel to the magnet 41 of the magnet module 40 described above.

The pair of terminals 72 may be connected to the both ends of the metal bar 71 and may protrude toward the coupler 20. In more detail, the pair of terminals 72 may be respectively provided on front surfaces of both ends of the metal bar 71 and may face the magnet module 40.

The terminal 71 may protrude toward the coupler 20 from the changer body 60 through the through-hole 63 defined in the changer body 60. One of the pair of terminals 72 may face a position corresponding to one metal body 42, and the other of the pair of terminals 72 may face a position corresponding to the other metal body 42.

In one example, the mounter 80 may be located below the coupler 20. That is, the coupler 20 may be mounted to the mounter 80 to be upward of the mounter 80 or separated from the mounter 80.

The mounter 80 may include a fixing bar 81 and mounting pins 82 provided at both ends of the fixing bar 81.

The fixing bar 81 and the mounting pin 82 may be magnetic materials. Thus, while the coupler 20 is mounted on the mounter 80, the magnetic field by the magnet 41 of the magnet module 40 may be strongly induced along the fixing bar 81 and the mounting pins 82.

The fixing bar 81 may be elongated in one direction (e.g., a lateral direction). The fixing bar 81 may be elongated in a direction parallel to the magnet 41 of the magnet module 40 described above.

The fixing bar 81 may be fixed to the structure 4 (see FIG. 4) described above. It is apparent that the structure 4 is located outward of the housing 30 of the coupler 20.

The mounting pins 82 may be provided at both ends of the fixing bar 81. The mounting pins 82 may include a pair of mounting pins 82 spaced apart from each other in a longitudinal direction of the fixing bar 81.

In more detail, the mounting pins 82 may be respectively formed on top faces of the both ends of the fixing bar 81, and may be arranged vertically.

The mounting pin 82 may be inserted into a mounting groove 34 defined in the housing 30 of the coupler 20. This allows the coupler 20 to be mounted to the mounter 80.

Figure 8:
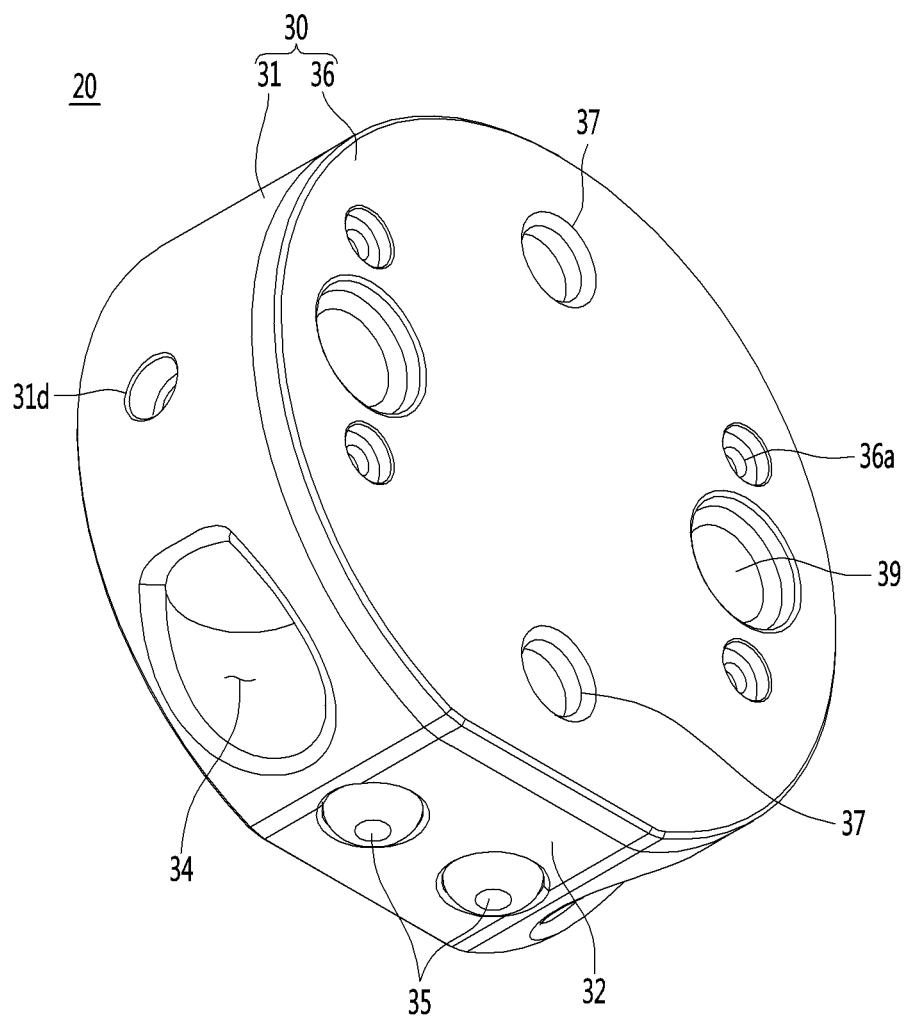
FIG. 8 is a perspective view of a tool coupler according to an embodiment of the present disclosure viewed from another direction.
Figure 9:
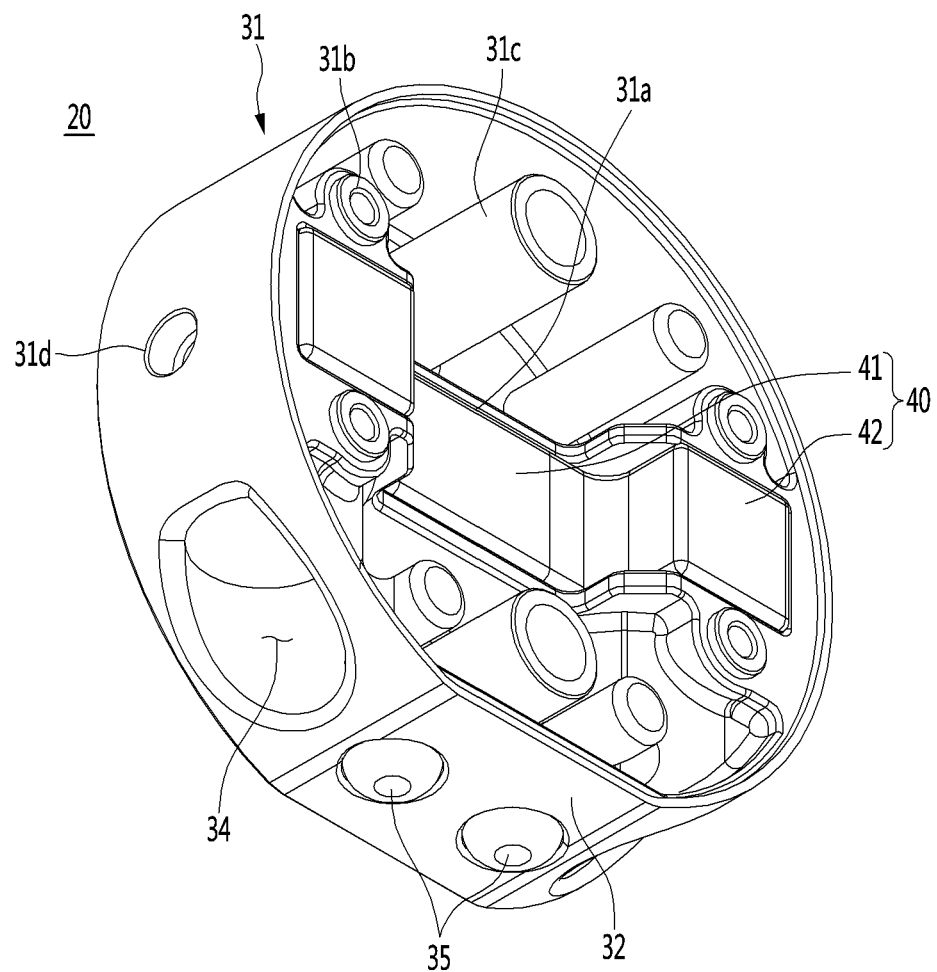
FIG. 9 is a view illustrating a tool coupler shown in FIG. 8 from which a housing cover is removed.

FIG. 8 is a perspective view of a tool coupler according to an embodiment of the present disclosure viewed from another direction, and FIG. 9 is a view illustrating a tool coupler shown in FIG. 8 from which a housing cover is removed.

Inside the housing 30 of the coupler 20, an inner receiving groove 31a in which the magnet module 40 is accommodated may be defined. In more detail, the inner receiving groove 31a may be defined in the housing body 31. The inner receiving groove 31a may open toward the housing cover 36.

A fastening boss 31b may be formed in the housing body 31, and a fastening hole 36a corresponding to the fastening boss 31b may be defined in the housing cover 36. The fastening boss 31b may be formed inside the housing body 31 and face the housing cover 36. The fastening hole 36a may be defined through the housing cover 36. The fastening boss 31b and the fastening hole 36a may respectively include a plurality of fastening bosses and fastening holes.

A fastening member such as a screw or the like may be fastened to the fastening boss 31b through the fastening hole 36a. As a result, the housing body 31 and the housing cover 36 may be fastened with each other. In order not to affect the magnetic field by the magnet module 40, the fastening member may be a non-magnetic material.

In the housing body 31, an insertion boss 31c in communication with the insertion hole 37 defined in the housing cover 36 may be formed. The insertion boss 31c may be formed inside the housing body 31 and may face the housing cover 36.

The support pin 61 (see FIG. 7) of the changer 50 may be sequentially inserted into the insertion hole 37 and the insertion boss 31c. That is, the support pin 61 may be inserted into the insertion boss 31c through the insertion hole 37. Therefore, the coupler 20 may be reliably supported in the vertical direction by the support pin 61.

The housing 30 may have a fastening hole 31d defined therein, and the magnet module 40 may have a fastening groove 42c (see FIG. 7) defined therein corresponding to the fastening hole 31d.

The fastening hole 31d may be defined in the circumferential surface of the housing 30, more particularly, of the housing body 31. The fastening hole 31d may include a pair of fastening holes spaced apart from each other in a longitudinal direction of the magnet module 40. The fastening hole 31d may be located sideward of the inner receiving groove 31a defined in the housing body 31. The fastening hole 31d may be in communication with interior of the inner receiving groove 31a.

The fastening groove 42c may be defined in the magnet module 40, more specifically, in the metal body 42. When the magnet module 40 is accommodated in the inner receiving groove 31a, the fastening groove 42c may be positioned in line with the fastening hole 31d.

The fastening member such as the screw or the like may be fastened to the fastening groove 42c through the fastening hole 31d. As a result, the magnet module 40 may be firmly fastened to the housing body 31, and the magnet module 40 may be prevented from deviating from the inner receiving groove 31a. In order not to affect the magnetic field by the magnet module 40, the fastening member may be a non-magnetic material.

The mounting groove 34 defined in the circumferential surface of the housing 30 may be located below the both ends of the inner receiving groove 40. The mounting groove 34 may not be in communication with the inner receiving groove 31a.

The coupler 20 may have at least one buffer member 35. The buffer member 31a may contain a material that is elastically deformed, such as rubber, urethane, or the like. The buffer member 35 may be referred to as a coupler buffer member.

In more detail, the buffer member 35 may be formed on a bottom surface 32 of the housing 30. The bottom surface 32 of the housing 30 may be included in the circumferential surface of the housing 30 and may be a horizontal plane. The bottom surface 32 of the housing 30 and the buffer member 35 may be located between the pair of mounting grooves 34 with respect to a circumferential direction of the housing 30.

The buffer member 35 may protrude downward from the bottom surface 32 of the housing 30. The buffer member 35 may minimize an impact of the coupler 20 on the mounter 80 while the coupler 20 is mounted on the mounter 80 (see FIG. 7).

The bottom surface 32 of the housing 30 and the buffer member 35 may face a top face of the fixing bar 81 (see FIG. 7) of the mounter 80. More specifically, the top portion of the fixing bar 81 may have a step portion 81a (see FIG. 7) facing the bottom surface 32 of the housing 30 and the buffer member 35. The step portion 81a may be formed to be stepped downward with respect to the top face of the fixing bar 81. The step portion 81a may be located between the pair of mounting pins 82. When the coupler 20 is mounted to the mounter 80, the buffer member 35 may come into contact with the step portion 81a.

The step portion 81a allows the mounting pin 82 to be inserted deeply into the mounting groove 34 without interference between the housing 30 of the coupler 20 and the fixing bar 81. This allows the coupler 20 to be stably mounted to the mounter 80.

Further, the housing cover 36 may have an outer recess 39 defined therein at a position corresponding to an end of the metal body 42, more specifically, of the bent portion 42b. That is, the outer recess 39 may be recessed toward the magnet module 40. The outer recess 39 may be formed stepped with respect to the rear surface of the housing cover 36.

The outer recess 39 may be defined by recessing the rear surface (outer surface) of the housing cover 36, and may be defined at a position corresponding to the inner recess 38 (see FIG. 7). That is, the inner recess 38 and the outer recess 39 may overlap each other in a front and rear direction.

When the changer 50 and the coupler 20 are fastened with each other, an end of the terminal 72 of the changer 50 may be located in the outer recess 39. As described above, the end of the bent portion 42b of the metal body 42 is located in the inner recess 38, so that a distance between the metal body 42 and the terminal 72 may be minimized. Thus, a magnetic force between the metal body 42 and the terminal 72 may be maintained sufficiently strong.

Figure 10:
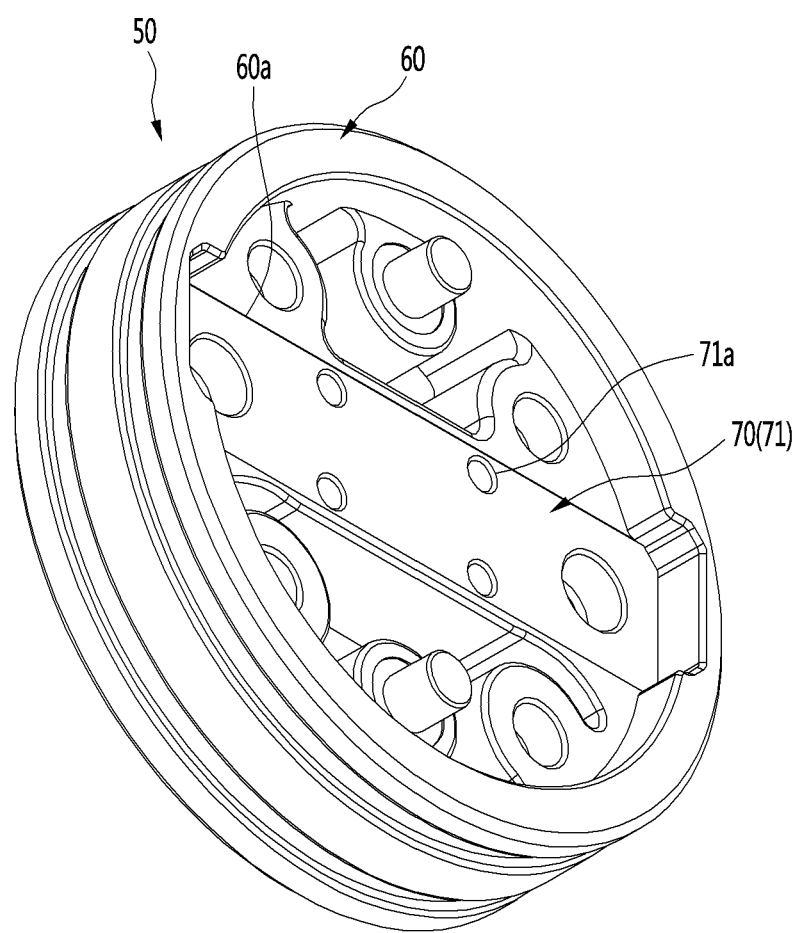
FIG. 10 is a perspective view of a tool changer according to an embodiment of the present disclosure viewed from another direction.

FIG. 10 is a perspective view of a tool changer according to an embodiment of the present disclosure viewed from another direction.

In the changer body 60 of the changer 50, a receiving groove 60a for accommodating the magnetic module 70 therein may be defined. In more detail, the receiving groove 60a may be opened opposite the coupler 20, that is, rearwards.

A first fastening hole 60b (see FIG. 7) may be defined in the changer body 60, and a second fastening hole 71a corresponding to the first fastening hole 60b may be defined in the metal bar 71 of the magnetic module 70. The first fastening hole 60b and the second fastening hole 71a may respectively include a plurality of first fastening holes and second fastening holes.

The first fastening hole 60b may be in communication with interior of the receiving groove 60a. That is, the first fastening hole 60b may be defined to penetrate from the front surface of the changer body 60 to the receiving groove 60a.

A second fastening hole 71a may be defined through the metal bar 71. The second fastening hole 71a may be located between the pair of terminals 72. When the magnetic module 70 is accommodated in the receiving groove 60a, the second fastening hole 71a may be in line with the first fastening hole 60b.

The fastening member such as the screw or the like may be fastened to the first fastening hole 60b and the second fastening hole 71a. As a result, the magnetic module 70 may be firmly fastened to the changer body 60, and the magnetic module 70 may be prevented from deviating from the receiving groove 60a. In order not to affect the magnetic field by the magnet module 40, the fastening member may be a non-magnetic material.

Figure 11:
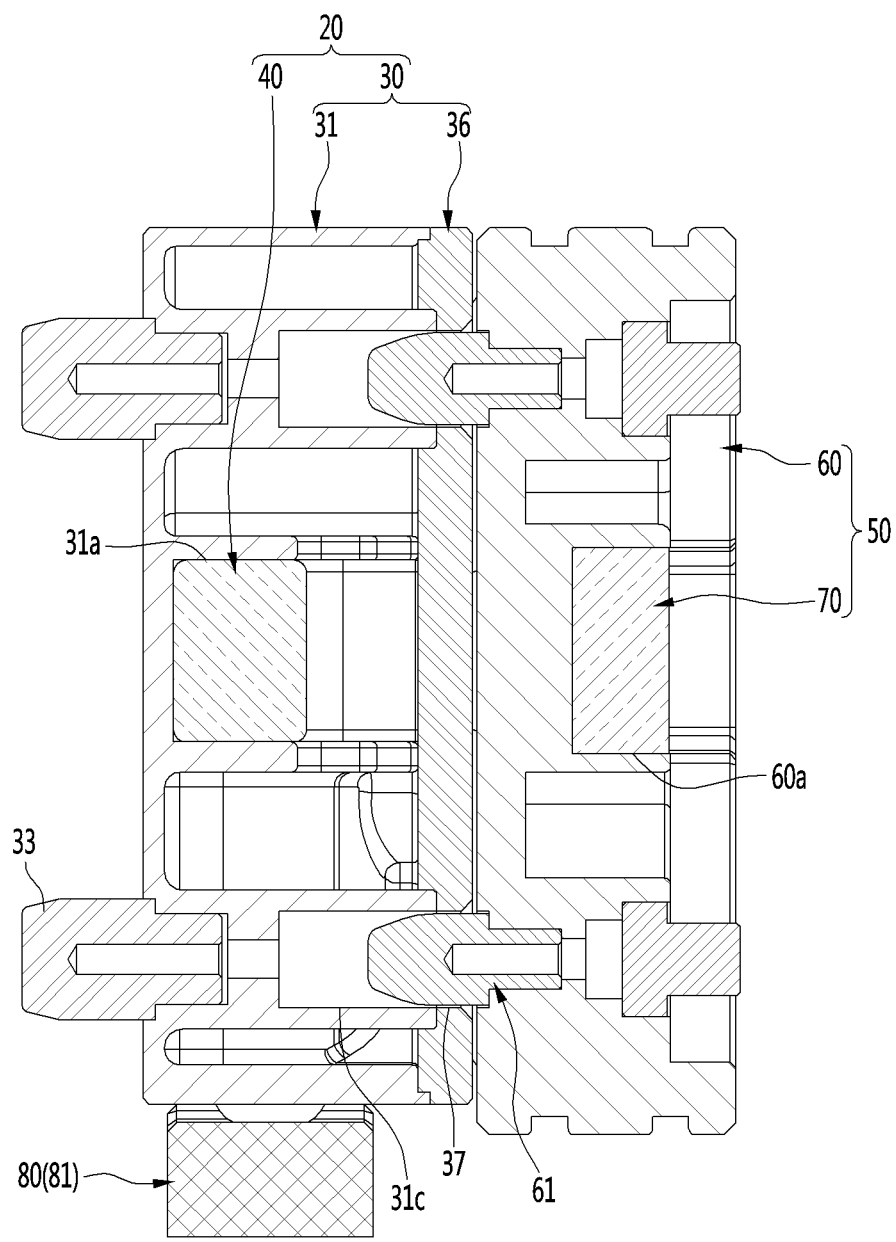
FIG. 11 is a cross-sectional view taken along a line A-A' of FIG. 6.
Figure 12:
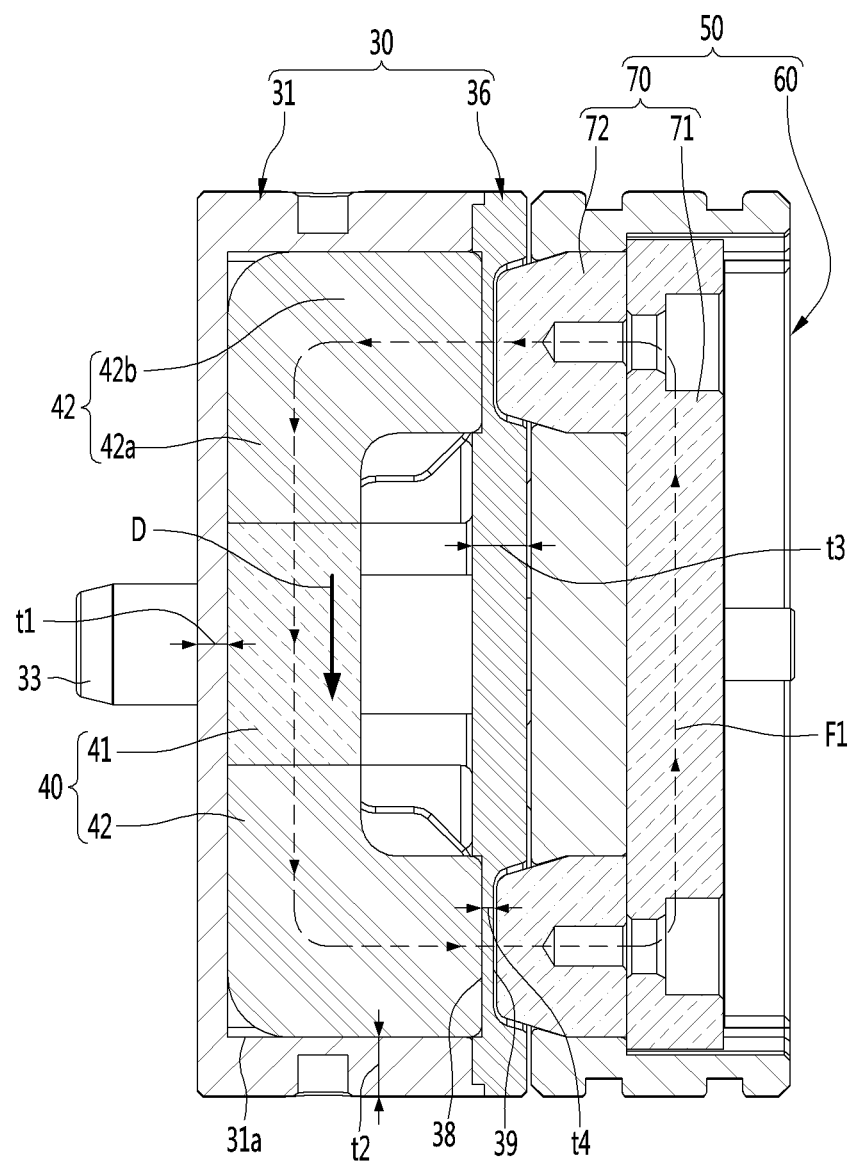
FIG. 12 is a cross-sectional view taken along a line B-B' of FIG. 6.
Figure 13:
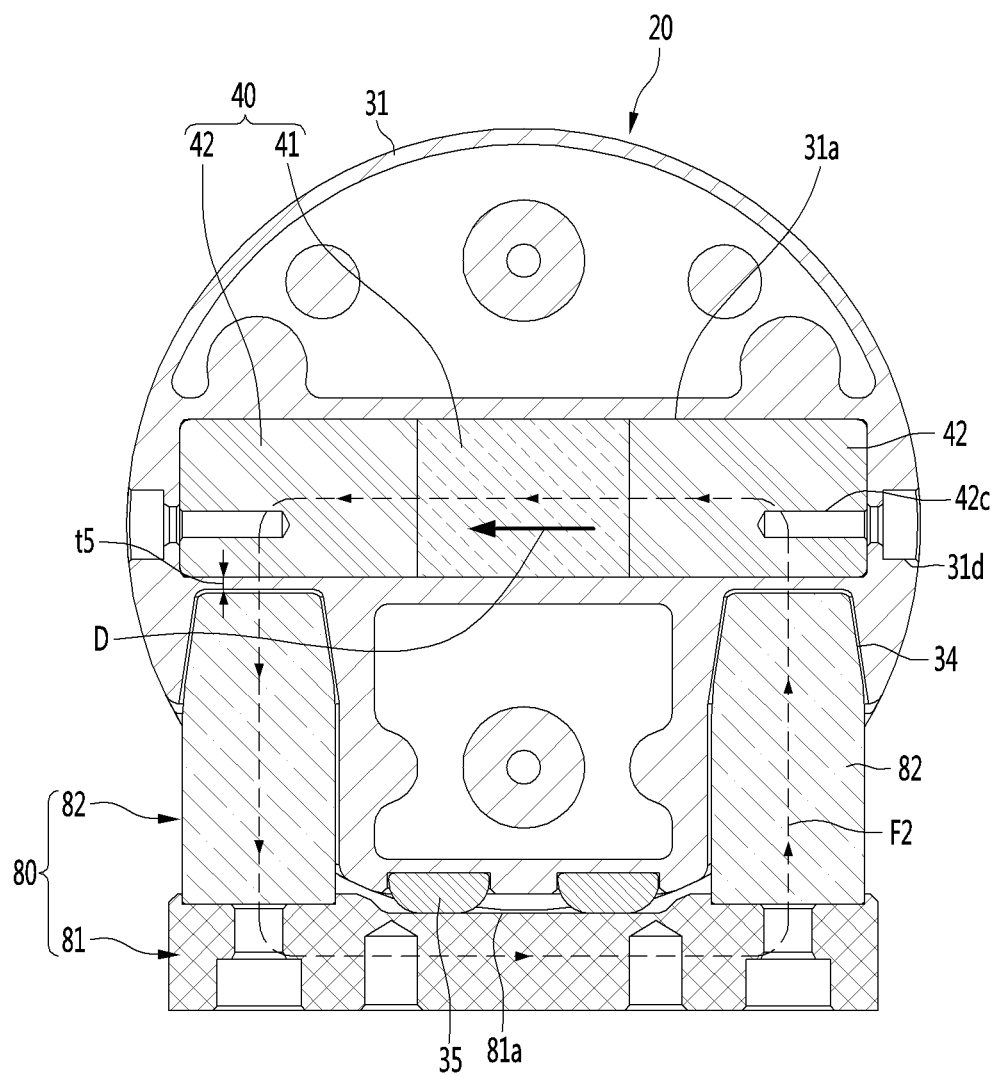
FIG. 13 is a cross-sectional view taken along a line C-C' of FIG. 6.

FIG. 11 is a cross-sectional view taken along a line A-A' of FIG. 6. Further, FIG. 12 is a cross-sectional view taken along a line B-B' of FIG. 6. Further, FIG. 13 is a cross-sectional view taken along a line C-C' of FIG. 6.

Hereinafter, the fastening between the coupler 20 and the changer 50 will be described with reference to FIGS. 11 and 12.

The changer 50 may be selectively fastened with the coupler 20. The changer 50 may be fastened to the coupler 20 from the rear of the coupler 20.

When the changer 50 is fastened to the coupler 20, the support pin 61 of the changer 50 may be inserted into the insertion hole 37 and the insertion boss 31c of the coupler 20, and the terminal 72 of the changer 50 may be inserted into the outer recess 39 of the coupler 20.

The support pin 61 may support the coupler 20 in a radial direction (e.g., vertical direction) of the changer 50. The support pin 61 may protrude further forward than the terminal 72 from the changer body 60 of the changer 50. Therefore, the support pin 61 may be inserted deeply into the insertion hole 37 and the insertion boss 31c of the housing of the coupler. Therefore, the support pin 61 may stably support the coupler 20 in the radial direction of the changer 50.

The coupler 20 and the changer 50 may be fastened to each other by a magnetic force between the magnetic module 70 of the changer 50 and the magnet module 40 of the coupler 20. The magnetic force may act as a coupling force in an axial direction (e.g., front and rear direction) of the changer 50.

The metal body 42 of the magnet module 40 and the terminal 72 of the magnetic module 70 may be adjacent each other in the axial direction (e.g., the front and rear direction) of the changer 50. In more detail, the bent portion 42b of the metal body 42 and the terminal 72 may be adjacent each other in the axial direction (e.g., the front and rear direction) of the changer 50. The terminal 72 may be located rearward of the bent portion 42b. Therefore, a magnetic force (attraction) may act between the metal body 42 and the terminal 72.

In more detail, the magnet module 40 and the magnetic module 70 may form a first magnetic flux loop F1 together. The first magnetic flux loop F1 may mean a path of magnetic flux formed by magnetic flux generated by the magnet 41 being induced by the metal body 42 and the magnetic module 70. The first magnetic flux loop F1 may be a closed loop.

The first magnetic flux loop F1 is started from one pole (N pole) of the magnet 41, sequentially passes through one metal body 42, one terminal 72, the fixing bar 71, another terminal 72, and another metal body 42, and then is lead to an opposite pole (S pole) of the magnet 41.

The inner recess 38 into which the bent portion 42b of the metal body 42 is inserted may be defined in the inner surface of the housing cover 36, and the outer recess 39 into which the terminal 72 is inserted may be defined in the outer surface of the housing cover 36.

A thickness t4 of a portion between the inner recess 38 and the outer recess 39 may be less than thicknesses t1 and t2 of the housing body 31. More specifically, the thickness t4 of the portion between the inner recess 38 and the outer recess 39 may be less than a thickness t1 of the front surface of the housing body 31, and may be less than a thickness t2 of the circumference of the housing body 31. In addition, the thickness t4 of the portion between the inner recess 38 and the outer recess 39 may be less than a thickness t3 of the housing cover 36. Therefore, the distance between the metal body 42 and the terminal 72 may be minimized and the first magnetic flux loop F1 may be formed smoothly.

In addition, as a portion of the terminal 72 is inserted into the outer recess 39, the terminal 72 may support the coupler 20 in the radial direction of the changer 50 together with the support pin 61.

Hereinafter, mounting between the coupler 20 and the mounter 80 will be described with reference to FIG. 13.

The coupler 20 may be selectively mounted to the mounter 80. The coupler 20 may be fastened to the mounter 80 upward of the mounter 80.

When the coupler 20 is mounted on the mounter 80, the mounting pin 82 of the mounter 80 may be inserted into the mounting groove 34 of the coupler 20.

The coupler 20 may be mounted on the mounter 80 by a magnetic force between the magnet module 40 of the coupler 20 and the mounter 80. The magnetic force may act as a coupling force in the vertical direction of the changer 50.

The metal body 42 of the magnet module 40 and the mounting pin 82 of the mounter 80 may be adjacent each other in the vertical direction. The metal body 42 may be located upward of the mounting pin 82. Accordingly, a magnetic force (attraction) may be applied between the metal body 42 and the mounting pin 82.

In more detail, the magnet module 40 and the mounter 80 may form a second magnetic flux loop F2 together. The second magnetic flux loop F2 may mean a path of magnetic flux formed by magnetic flux generated by the magnet 41 being induced by the metal body 42 and the mounter 80. The second magnetic flux loop F2 may be a closed loop.

The second magnetic flux loop F2 is started from one pole (N pole) of the magnet 41, sequentially passes through one metal body 42, one mounting pin 82, the fixing bar 81, another mounting pin 82, and another metal body 42, and then is lead to the opposite pole (S pole) of the magnet 41.

The inner receiving groove 31a into which the magnet module 40 is accommodated and the mounting groove 34 into which the mounting pin 82 is inserted may be defined in the housing 30.

A thickness t5 of a portion between the inner receiving groove 31a and the mounting groove 34 may be less than thicknesses t1 and t2 of the housing body 31. More specifically, the thickness t5 of the portion between the inner receiving groove 31a and the mounting groove 34 may be less than the thickness t1 of the front surface of the housing body 31, and may be less than the thickness t2 of the circumference of the housing body 31. In addition, the thickness t5 of the portion between the inner receiving groove 31a and the mounting groove 34 may be less than the thickness t3 of the housing cover 36. Therefore, a distance between the metal body 42 and the mounting pin 82 may be minimized and the second magnetic flux loop F2 may be formed smoothly.

In addition, the mounting pin 82 is inserted into the mounting groove 34, so that the coupler 20 may be constrained to the mounter 80 in the horizontal direction.

Figure 14:
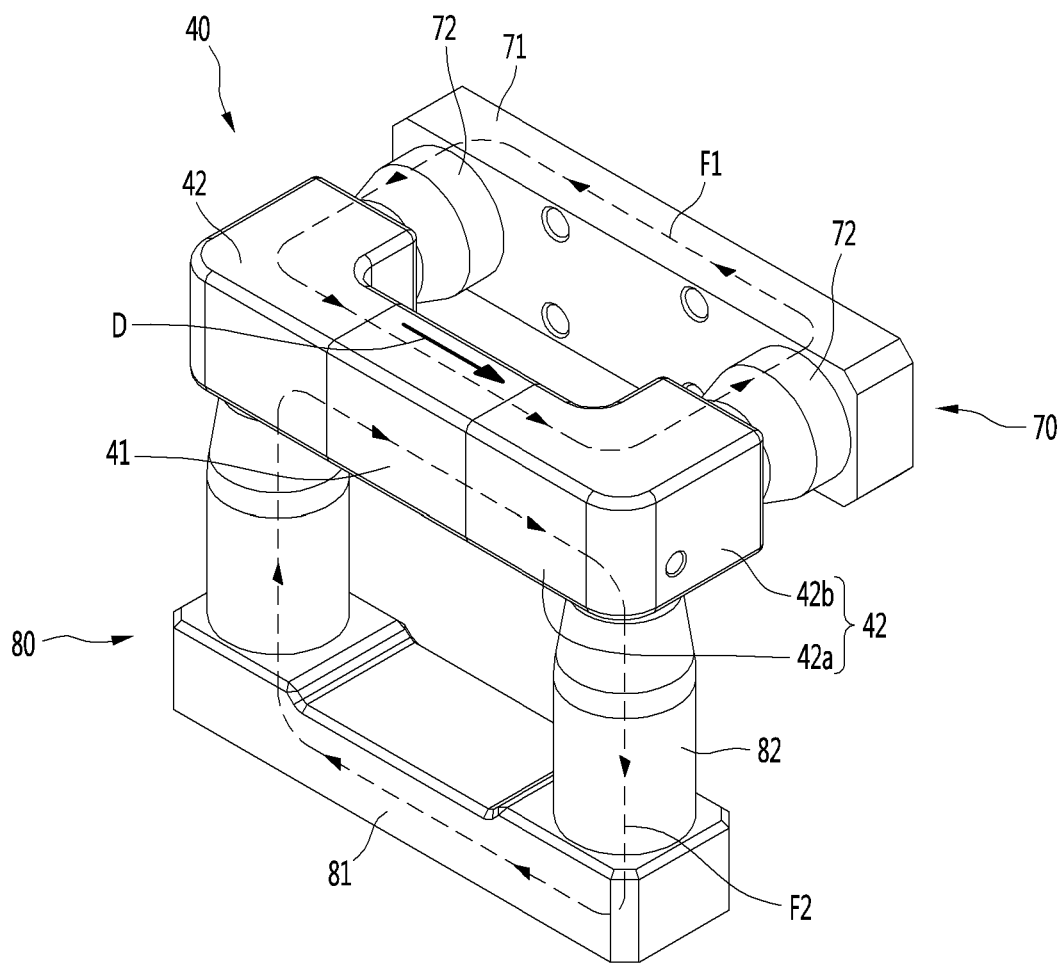
FIG. 14 is a view for explaining an operation when a tool coupler fastened to a tool changer is mounted to a tool mounter.
Figure 15:
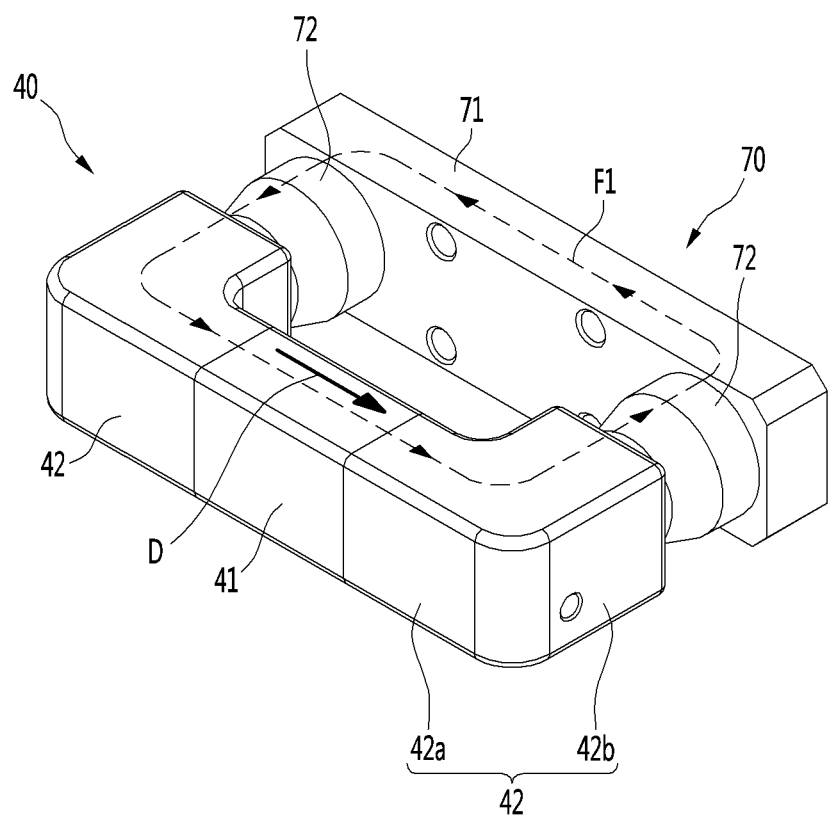
FIG. 15 is a view for explaining an operation when a tool coupler fastened to a tool changer is separated from a tool mounter.
Figure 16:
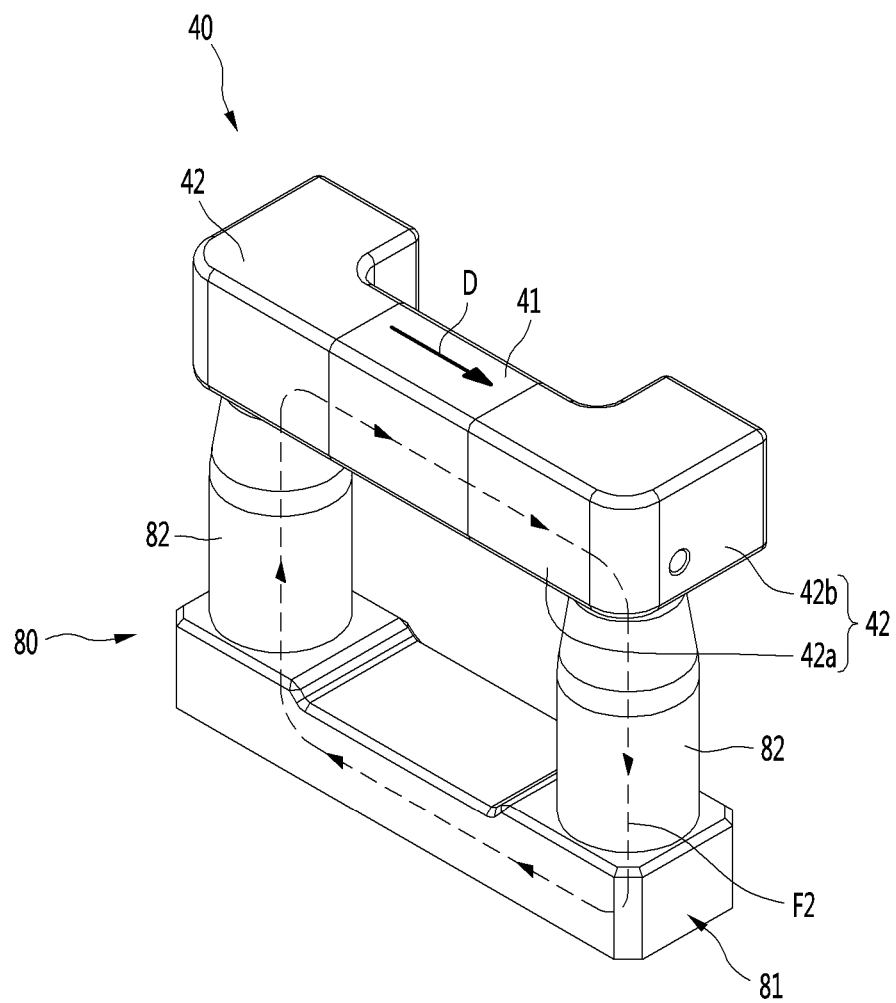
FIG. 16 is a view for explaining an operation when a tool coupler separated from a tool changer is mounted to a tool mounter.

FIG. 14 is a view for explaining an operation when a tool coupler fastened to a tool changer is mounted to a tool mounter. Further, FIG. 15 is a view for explaining an operation when a tool coupler fastened to a tool changer is separated from a tool mounter. Further, FIG. 16 is a view for explaining an operation when a tool coupler separated from a tool changer is mounted to a tool mounter.

In a state in which the coupler 20 is mounted on the mounter 80 and fastened with the changer 50, the magnetic force generated by the magnet module 40 may be distributed to and act on the magnetic module 70 and the mounter 80.

Referring to FIG. 14, the magnetic force (attraction) may be applied between the metal body 42 and the terminal 72, and the magnetic force (attraction) may also be applied between the metal body 42 and the mounting pin 82.

The magnetic force acting between the metal body 42 and the terminal 72 may be referred to as a first coupling force, and the magnetic force acting between the metal body 42 and the mounting pin 82 may be referred to as a second coupling force. Strengths of the first coupling force and the second coupling force may be the same as or similar to each other.

As described above, the magnet module 40 and the magnetic module 70 may together form the first magnetic flux loop F1, and the magnet module 40 and the mounter 80 may together form the second magnetic flux loop F2. The first magnetic flux loop F1 may start from the magnet 41, sequentially pass through one metal body 42, one terminal 72, the metal bar 71, the other terminal 72, and the other metal body 42, and lead to the magnet 41. The second magnetic flux loop F2 may start from the magnet 41, sequentially pass through one metal body 42, one mounting pin 82, the fixing bar 81, the other mounting pin 82, and the other metal body 42, and lead to the magnet 41.

That is, the first magnetic flux loop F1 and the second magnetic flux loop F2 may share the magnet module 40. Therefore, the magnetic force by the magnet module 40 may be distributed to and act on the magnetic module 70 and the mounter 80.

In more detail, when the first magnetic flux loop F1 and the second magnetic flux loop F2 are present at the same time, compared to a case where the first magnetic flux loop F1 or the second magnetic flux loop F2 exists alone, magnetic flux densities of the first magnetic flux loop F1 and the second magnetic flux loop F2 may be relatively small.

Since the magnetic flux density is proportional to the strength of the magnetic force, when the first coupling force and the second coupling force act at the same time, compared to a case where the first coupling force or the second coupling force acts alone, the strengths of the first and second coupling forces may be relatively small.

Therefore, in a process of mounting the tool 3 (see FIG. 4) to the mounter 80, since the strength of the first coupling force is relatively weak, the changer 50 may be easily separated from the coupler 20 mounted on the mounter 80.

Further in a process of separating the tool 3 (see FIG. 4) from the mounter 80, since the strength of the second coupling force is relatively weak, the changer 50 may easily separate the coupler 20 from the mounter 80.

Further, when the coupler 20 is fastened to the changer 50 and separated from the mounter 80, the magnetic force generated by the magnet module 40 may act on the magnetic module 70.

Referring to FIG. 15, the magnetic force (attraction), that is, the first coupling force may act between the metal body 42 and the terminal 72.

In more detail, the magnet module 40 and the magnetic module 70 may form the first magnetic flux loop F1 together. The first magnetic flux loop F1 may start from the magnet 41, sequentially pass through one metal body 42, one terminal 72, the metal bar 71, the other terminal 72, and the other metal body 42, and then lead to the magnet 41.

Since the first magnetic flux loop F1 exists alone, compared to the case where the first magnetic flux loop F1 and the second magnetic flux loop F2 are present at the same time, the magnetic flux density of the first magnetic flux loop F1 may be relatively large. That is, the strength of the first coupling force may become relatively strong.

Therefore, the coupler 20 may be reliably fastened to the changer 50. Further, while the manipulator M (see FIG. 4) performs the task using the tool 3, the coupler 20 may not be separated from the changer 50.

Further, when the coupler 20 is fastened to the mounter 80 and separated from the changer 50, the magnetic force generated by the magnet module 40 may act on the mounter 80.

Referring to FIG. 16, the magnetic force (attraction), that is, the second coupling force may act between the metal body 42 and the mounting pin 82.

In more detail, the magnet module 40 and the mounter 80 may form the second magnetic flux loop F2 together. The second magnetic flux loop F2 may start from the magnet 41, sequentially pass through one metal body 42, one mounting pin 82, the fixing bar 81, the other mounting pin 82, and the other metal body 42, and then lead to the magnet 41.

Since the second magnetic flux loop F2 exists alone, compared to the case where the first magnetic flux loop F1 and the second magnetic flux loop F2 are present at the same time, the magnetic flux density of the second magnetic flux loop F2 may be relatively high. That is, the strength of the second coupling force may become relatively strong.

Therefore, the coupler 20 may be reliably mounted to the mounter 80, and may prevent the coupler 20 from deviating upward from the mounter 80 due to an external impact or the like.

Figure 17A:
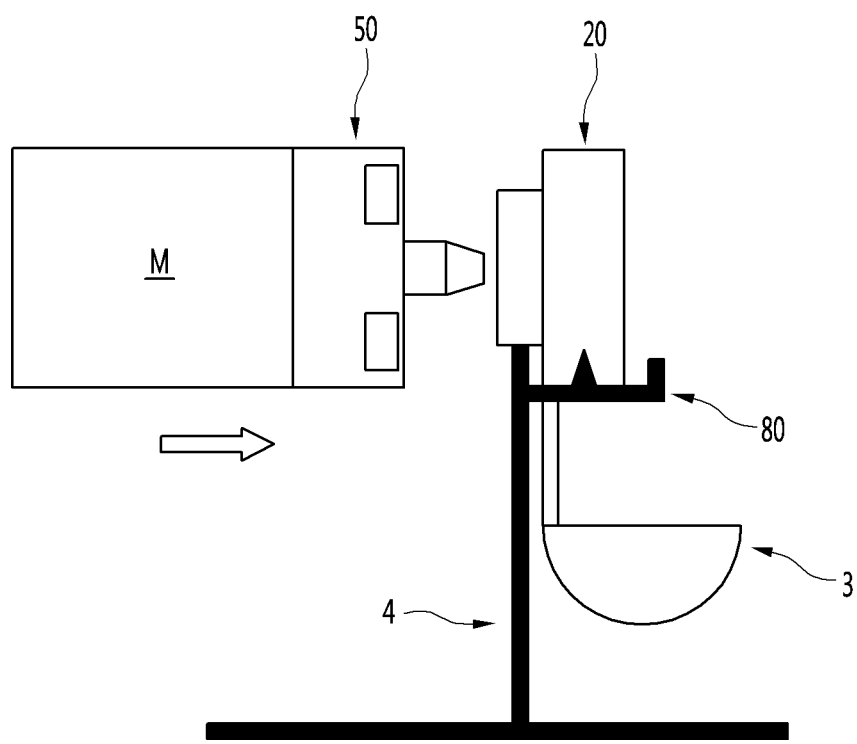
FIGS. 17A to 17C illustrate a process of separating a tool from a tool mounter.
Figure 17B:
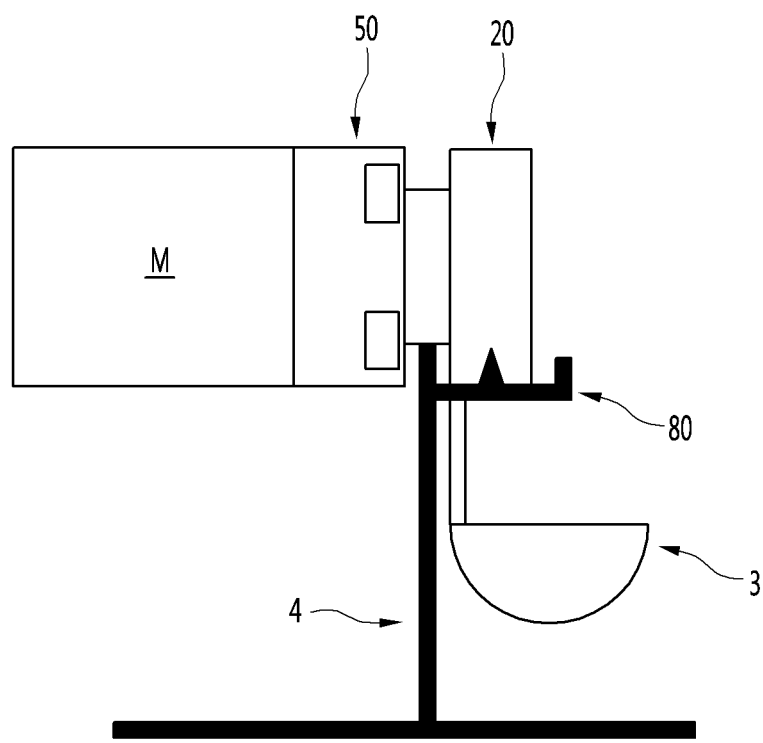
Figure 17C:
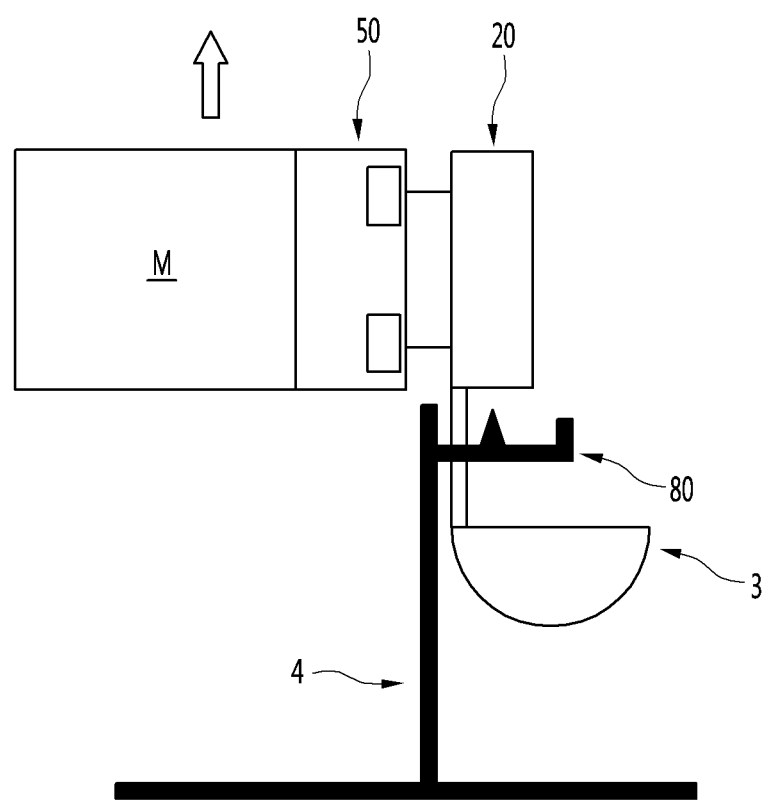

FIGS. 17A to 17C illustrate a process of separating a tool from a tool mounter.

The manipulator M may separate the tool 3 to be used from the mounter 80.

As shown in FIG. 17A, the manipulator M may move, from the rear of the coupler 20, the changer 50 toward the coupler 20 to which the tool 3 is fastened. In this connection, the coupler 20 may be in a state in which the coupler 20 is mounted on the mounter 80 and the second coupling force acts alone between the coupler 20 and the mounter 80.

When the changer 50 is fastened to the coupler 20 as shown in FIG. 17B, the first coupling force may act between the changer 50 and the coupler 20, and the second coupling force may act between the coupler 20 and the mounter 80. As described above, when the first coupling force and the second coupling force act simultaneously, compared to the case where the first coupling force or the second coupling force acts alone, the strengths of the first coupling force and the second coupling force may be reduced.

That is, the metal bar 71 and the pair of terminals 72 form the first magnetic flux loop F1 together with the magnet module 40, so that the existing second magnetic flux loop F2 may be weakened and the magnetic force between the tool coupler 20 and the tool mounter 80 may be distributed.

As shown in FIG. 17C, the manipulator M may lift the changer 50 coupled to the coupler 20. Since the support pin 61 (see FIG. 7) of the changer 50 supports the coupler 20 in the vertical direction, the coupler 20 and the tool 3 may be separated from the mounter 80.

In addition, since the changer 50 is lifted when the strength of the second coupling force acting between the coupler 20 and the mounter 80 is relatively small, the coupler 20 may be separated from the mounter 80 smoothly.

When the coupler 20 is completely separated from the mounter 80, the first coupling force may act alone between the changer 50 and the coupler 20. In this connection, the strength of the first coupling force may become relatively large compared to the case where the first and second coupling forces act simultaneously. Therefore, the coupler 20 may not be separated from the changer 50 while the manipulator M (see FIG. 4) performs the task using the tool 3.

Figure 18A:
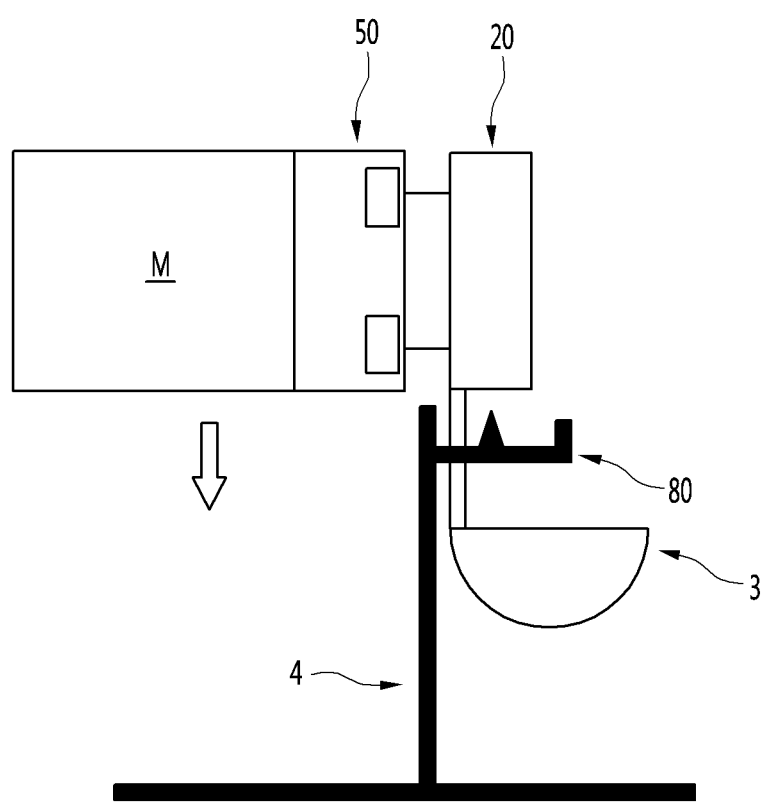
FIGS. 18A to 18C illustrate a process of mounting a tool on a tool mounter.
Figure 18B:
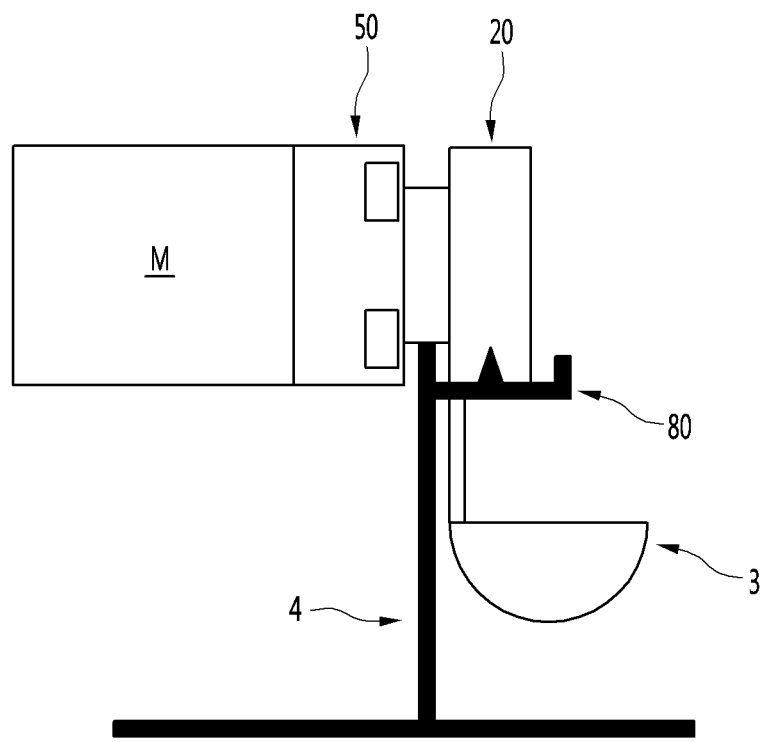
Figure 18C:
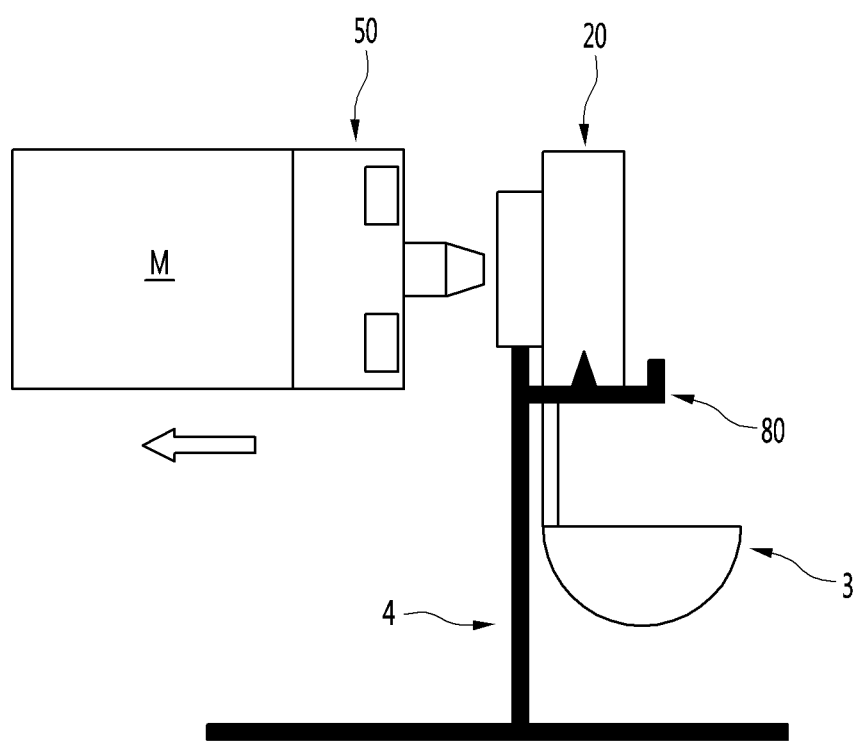

FIGS. 18A to 18C illustrate a process of mounting a tool on a tool mounter.

Manipulator M may mount the tool 3 that has been used on the mounter 80.

As shown in FIG. 18A, the manipulator M may lower the coupler 20 fastened to the changer 50 toward the mounter 80 from upward of the mounter 80. In this connection, the coupler 20 may be in a state in which the coupler 20 is mounted on the mounter 80 and the second coupling force acts alone between the coupler 20 and the mounter 80. In addition, the coupler 20 may be supported in the vertical direction by the support pin 61 (see FIG. 7) of the changer 50.

When the changer 50 is mounted to the mounter 80 as shown in FIG. 18B, the first coupling force may act between the changer 50 and the coupler 20, and the second coupling force may act between the coupler 20 and the mounter 80. As described above, when the first coupling force and the second coupling force act simultaneously, compared to the case where the first coupling force or the second coupling force acts alone, the strengths of the first coupling force and the second coupling force may be reduced.

That is, the fixing bar 81 and the pair of mounting pins 82 form the second magnetic flux loop F2 together with the magnet module 40, so that the existing first magnetic flux loop F1 may be weakened and the magnetic force between the tool changer 50 and the tool coupler 20 may be distributed.

As shown in FIG. 18C, the manipulator M may move the changer 50 rearward from the coupler 20. The mounting pin 82 (see FIG. 7) of the mounter 80 constrains the coupler 20 in the horizontal direction, so that the coupler 20 may remain mounted on the mounter 80 and the changer 50 may be separated from the coupler 20.

In addition, since the changer 50 moves rearward while in a state in which the strength of the first coupling force acting between the coupler 20 and the changer 50 became relatively small, the changer 50 may be smoothly separated from the coupler 20.

When the changer 50 is completely separated from the coupler 20, the second coupling force may act alone between the coupler 20 and the mounter 80. In this connection, the strength of the second coupling force may become relatively large as compared with the case where the first and second coupling forces act simultaneously. Thus, the coupler 20 may be reliably mounted on mounter 80.

Figure 19:
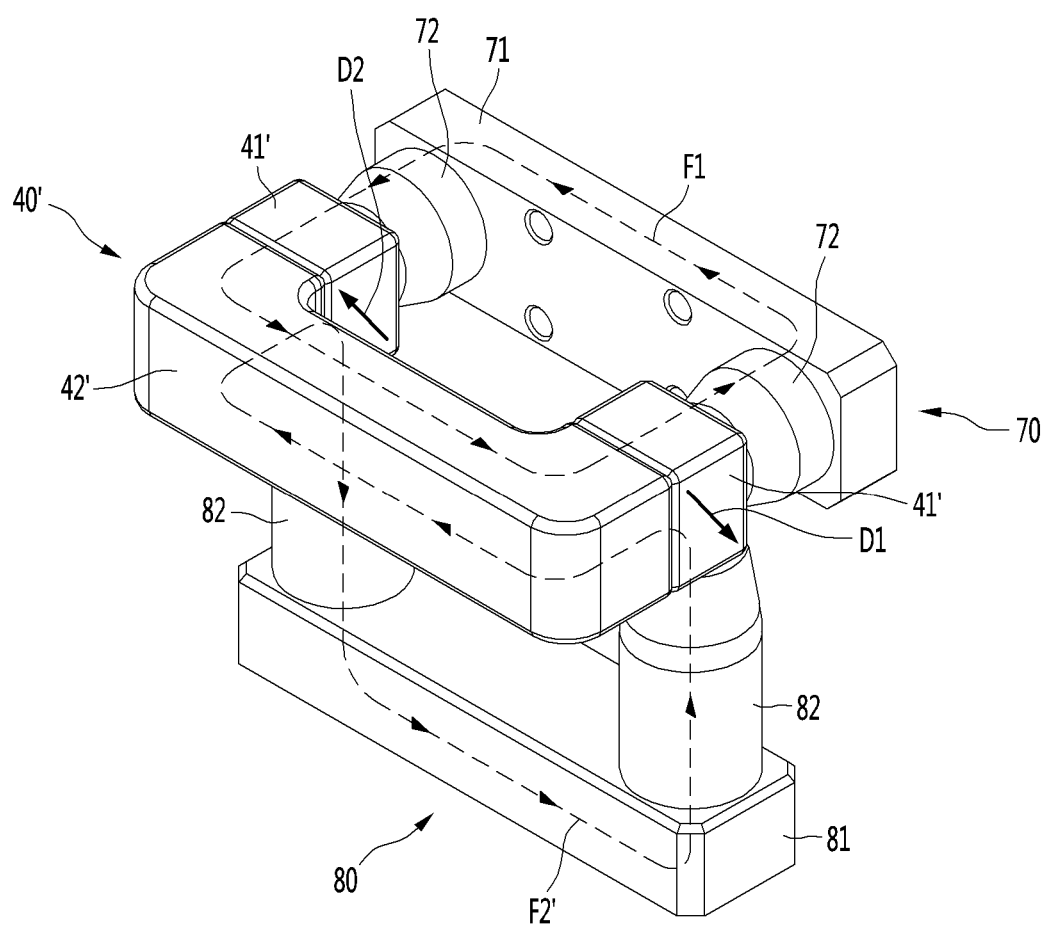
FIG. 19 illustrates a tool change system according to another embodiment of the present disclosure.

FIG. 19 illustrates a tool change system according to another embodiment of the present disclosure.

Hereinafter, the above description of the embodiment will be used for content overlapping with the above-described embodiment, and differences will be mainly described.

A magnet module 40' according to the present embodiment may include a metal body 42' and a pair of magnets 41' formed at both ends of the metal body 42'.

The metal body 42' may be elongated in one direction (e.g., lateral direction). The metal body 42' may be a magnetic material. Therefore, a magnetic field by the pair of magnets 41' may be strongly induced along the metal body 42'.

The pair of magnets 41' may be connected to the both ends of the metal body 42' and may protrude rearward. That is, the pair of magnets 41' may protrude toward the magnetic module 70. In more detail, the pair of magnets 41' may be provided on rear surfaces of the both ends of the metal body 42'.

The pair of magnets 41' of opposite poles may be attached to the metal body 42. An N pole of one of the pair of magnets 41' may be attached to the metal body 42, and a S pole of the other of the pair of magnets 41' may be attached to the metal body 42.

The magnet 41' and a terminal 72 of a magnetic module 70 may overlap each other in an axial direction (e.g., a front and rear direction) of the changer 50. The terminal 72 may be located rearward of the magnet 41'. Therefore, a magnetic force (attraction) may act between the magnet 41' and the terminal 72.

The magnet module 40' and the magnetic module 70 may form a first magnetic flux loop F1' together. The first magnetic flux loop F1' may be a closed loop. The first magnetic flux loop F1' may be started from one magnet 41', pass through one terminal 72, a metal bar 71, the other terminal 72, the other magnet 41', and a metal body 42', and lead to the magnet 41'.

The magnet 41' and a mounting pin 82 of a mounter 80 may overlap each other in a radial direction (e.g., a vertical direction) of the changer 50. The mounting pin 82 may be located rearward of the magnet 41'. Therefore, a magnetic force (attraction) may act between the magnet 41' and the mounting pin 82.

The magnet module 40' and the mounter 80 may form a second magnetic flux loop F2' together. The second magnetic flux loop F2' may be a closed loop. The second magnetic flux loop F2' may be started from one magnet 41', pass through one mounting pin 82, a fixing bar 81, the other mounting pin 82, the other magnet 41', and the metal body 42', and lead to one magnet 41'.

Since the magnetic flux of the magnet 41' is directed directly to the terminal 72 and the mounting pin 82 without passing through the metal body 42, a magnetic force acting on the terminal 72 and the mounting pin 82 is relatively strong.

However, the magnetic force by the magnet 41' acting on the terminal 72 and the mounting pin 82 may be sensitive to a magnetization direction of the magnet 41'. Therefore, in order to distribute the magnetic force by the magnet 41' evenly to the terminal 72 and to the mounting pin 82, magnetization directions D1 and D2 of the magnet 41' may be oblique to the terminal 72 and the mounting pin 82. In addition, the magnetization directions D1 and D2 of the magnet 41' may be oblique to the metal body 42'.

For example, a magnetization direction D1 of one magnet 41' and a magnetization direction D2 of the other magnet 41' may be parallel to each other and may be in opposite directions. The magnetization direction D1 of one magnet 41' may be inclined downward and rearward. The magnetization direction D2 of the other magnet 41' may be inclined upward and forward.

The description above is merely illustrative of the technical idea of the present disclosure, and various modifications and changes may be made by those skilled in the art without departing from the essential characteristics of the present disclosure.

Therefore, the embodiments disclosed in the present disclosure are not intended to limit the technical idea of the present disclosure but to illustrate the present disclosure, and the scope of the technical idea of the present disclosure is not limited by the embodiments.

The scope of the present disclosure should be construed as being covered by the scope of the appended claims, and all technical ideas falling within the scope of the claims should be construed as being included in the scope of the present disclosure.

In the tool change system according to a preferred embodiment of the present disclosure, the fastening/separation is achieved by the magnetic force, so that a separate external system is not required. As a result, the tool change system is compact.

In addition, the tool changer distributes the magnetic force between the tool coupler and the tool mounter, so that the tool changer may easily separate the tool coupler from the tool mounter.

In addition, the tool mounter distributes the magnetic force between the tool coupler and the tool changer, so that the tool changer may be easily separated from the tool coupler mounted on the tool mounter.

In addition, the tool coupler, the tool mounter, and the tool changer are fastened or mounted with each other by the magnetic force between the tool coupler, the tool mounter, and the tool changer, so that no separate control is required and an operation reliability of the tool change system is improved.

In addition, when the tool changer and the tool coupler are fastened with each other, the support pin may be inserted into the insertion hole defined in the coupler. This allows the tool coupler to be supported relative to the radial direction of the tool changer.

In addition, the tool coupler may have the inner recess into which a portion of the magnet module is inserted and the outer recess into which the terminal of the tool changer is inserted. As a result, the terminal may be guided in position and the first magnetic flux loop may be easily formed.

In addition, the tool coupler may have the mounting groove defined therein, into which the mounting pin of the mounter is inserted. As a result, the tool coupler may be stably mounted to the tool mounter, and the second magnetic flux loop may be easily formed.

In addition, the tool coupler may have the buffer member configured to be in contact with the tool mounter. As a result, when the tool coupler is fastened to the tool mounter, the impact applied to the tool mounter and the tool coupler may be minimized.

In addition, the tool changer may have the buffer member configured to be in contact with the tool coupler. As a result, when the tool changer is fastened to the tool coupler, the impact applied to the tool changer and the tool coupler may be minimized.

What is claimed is:

1. A tool change system comprising:
    a tool coupler including:
        a housing fastenable to a tool, the housing being formed of a non-magnetic material;
        a magnet assembly located in the housing; and
        a pair of mounting grooves defined in the housing and located below the magnet assembly;
    a tool changer including:
        a changer body configured to be provided on a manipulator, the changer body being formed of a non-magnetic material;

a metal bar mounted on the changer body, the metal bar being formed of a magnetic material; and a pair of terminals provided at opposite ends of the metal bar, the pair of terminals being formed of a magnetic material, the pair of terminals being oriented to face the magnet assembly when the tool changer is connected to the tool coupler; and a tool mounter including:

a fixing bar fixable to a structure located outside of the housing, the fixing bar being formed of a magnetic material; and a pair of mounting pins extending vertically upward from opposite ends of the fixing bar, the pair of mounting pins being formed of a magnetic material, the pair of mounting pins being insertable into the pair of mounting grooves in the housing.

2. The tool change system of claim 1, wherein the metal bar and the pair of terminals of the tool changer are configured to form a first magnetic flux loop with the magnet assembly, and wherein the fixing bar and the pair of mounting pins of the tool mounter are configured to form a second magnetic flux loop with the magnet assembly.

3. The tool change system of claim 1, wherein the housing includes:

a housing body having an internal space configured to accommodate the magnet assembly therein; and a housing cover covering the internal space and configured to face the changer body when the tool coupler is connected to the tool changer, the housing cover having outer recesses defined in an outer surface of the housing cover, and wherein the pair of terminals of the tool changer are respectively inserted into the outer recesses when the tool coupler is connected to the tool changer.

4. The tool change system of claim 3, wherein inner recesses corresponding to the outer recesses are defined in an inner surface of the housing cover, and wherein a portion of the magnet assembly is inserted into the inner recesses.

5. The tool change system of claim 3, wherein the changer body includes a support pin protruding therefrom, and wherein the housing cover includes an insertion hole configured to receive the support pin of the changer body when the tool coupler is connected to the tool changer.

6. The tool change system of claim 1, wherein the magnet assembly includes:

a magnet; and a pair of metal bodies connected to opposite poles of the magnet, the pair of metal bodies being arranged to face the pair of terminals of the tool changer when the tool coupler is connected to the tool changer, and wherein the pair of metal bodies are located above the pair of mounting pins when the tool coupler is connected to the tool mounter.

7. The tool change system of claim 1, wherein the magnet assembly includes:

a metal body elongated in a first direction; and a pair of magnets arranged to face the pair of terminals of the tool changer when the tool coupler is connected to the tool changer, wherein opposite poles of the pair of magnets are attached to opposite ends of the metal body.

8. The tool change system of claim 7, wherein each magnet is magnetized in an oblique direction with respect to a corresponding terminal of the pair of terminals and a corresponding mounting pin of the pair of mounting pins.

9. A tool coupler fastenable to a tool, the tool coupler being selectively fastenable to a tool changer and mountable to a tool mounter, the tool coupler comprising:

a housing, the housing being formed of a non-magnetic material;

a magnet assembly located in the housing;

a fastening mechanism provided on the housing, the fastening mechanism being configured to be fastenable to the tool;

a pair of insertion holes defined in the housing, the pair of insertion holes being configured to receive a pair of support pins of the tool changer therein; and a pair of mounting grooves defined in the housing and located below the magnet assembly, the pair of mounting grooves being configured to receive a pair of mounting pins of the tool mounter therein.

10. The tool coupler of claim 9, wherein the magnet assembly is configured to form a first magnetic flux loop with a pair of terminals and a metal bar of the tool changer when the tool coupler is fastened to the tool changer, and wherein the magnet assembly is configured to form a second magnetic flux loop with the pair of mounting pins and a fixing bar of the tool mounter when the tool coupler is mounted on the tool mounter.

11. The tool coupler of claim 10, wherein the housing includes:

a housing body, the housing body having the fastening mechanism formed thereon, the housing body having the mounting grooves defined therein, the housing body further having an internal space configured to accommodate the magnet assembly therein; and a housing cover covering the internal space, the housing cover having the insertion holes defined therein, the housing cover having outer recesses defined in an outer surface of the housing cover, the outer recesses being configured to receive the pair of terminals of the tool changer when the tool coupler is fastened to the tool changer.

12. The tool coupler of claim 11, wherein inner recesses corresponding to the outer recesses are defined in an inner surface of the housing cover, and wherein a portion of the magnet assembly is inserted into the inner recesses.

13. The tool coupler of claim 12, wherein a thickness of a portion of the housing cover between corresponding outer recess and inner recess is less than a thickness of the housing body.

14. The tool coupler of claim 9, wherein the magnet assembly includes:

a magnet; and a pair of metal bodies connected to opposite poles of the magnet, the pair of metal bodies being arranged to extend away from the fastening mechanism.

15. The tool coupler of claim 9, further comprising a buffer member disposed on the housing, the buffer member being located between the pair of mounting grooves.

16. A tool changer selectively fastenable to a tool coupler fastened to a tool, the tool changer being configured to selectively mount the tool coupler to a tool mounter or separate the tool coupler from the tool mounter, the tool changer comprising:

a changer body, the changer body being formed of a non-magnetic material;

a metal bar mounted on the changer body, the metal bar being formed of a magnetic material; and a pair of terminals provided at opposite ends of the metal bar, the pair of terminals being formed of a magnetic material, the pair of terminals protruding from a surface of the changer body.

17. The tool changer of claim 16, wherein the metal bar and the pair of terminals are configured to form a magnetic flux loop together with a magnet assembly of the tool coupler to provide a magnetic force between the tool coupler and the tool changer when the tool changer is fastened to the tool coupler.

18. The tool changer of claim 16, further comprising a buffer member disposed on the surface of the changer body from which the pair of terminals protrude.

19. A tool mounter for mounting a tool coupler thereon, the tool mounter comprising:
   a fixing bar, the fixing bar formed of a magnetic material; and
   a pair of mounting pins extending vertically upward from opposite ends of the fixing bar, the pair of mounting pins being formed of a magnetic material, the pair of mounting pins being insertable into a pair of mounting grooves of the tool coupler.

20. The tool mounter of claim 19, wherein the fixing bar and the pair of mounting pins are configured to form a magnetic flux loop together with a magnet assembly of the tool coupler to provide a magnetic force between the tool coupler and the tool mounter when the tool coupler is mounted on the tool mounter.

* * * * *